US008075824B2

(12) United States Patent
Yoshinaga et al.

(10) Patent No.: US 8,075,824 B2
(45) Date of Patent: *Dec. 13, 2011

(54) POLYIMIDE FILM MADE OF MULTICOMPONENT POLYIMIDE AND PROCESS OF PRODUCING THE SAME

(75) Inventors: Toshimune Yoshinaga, Ichihara (JP); Kenji Fukunaga, Ichihara (JP); Harutoshi Hoshino, Ichihara (JP)

(73) Assignee: UBE Industries, Ltd., Yamaguchi (JP)

( * ) Notice: Subject to any disclaimer, the term of this patent is extended or adjusted under 35 U.S.C. 154(b) by 57 days.

This patent is subject to a terminal disclaimer.

(21) Appl. No.: 12/374,900

(22) PCT Filed: Jul. 23, 2007

(86) PCT No.: PCT/JP2007/064468
§ 371 (c)(1),
(2), (4) Date: Jan. 23, 2009

(87) PCT Pub. No.: WO2008/013151
PCT Pub. Date: Jan. 31, 2008

(65) Prior Publication Data
US 2009/0258211 A1    Oct. 15, 2009

(30) Foreign Application Priority Data
Jul. 23, 2006    (JP) .................................. 2006-200149

(51) Int. Cl.
*B29D 7/00*    (2006.01)
(52) U.S. Cl. .................. 264/212; 264/331.19; 525/432; 525/436

(58) Field of Classification Search .................. 264/212, 264/331.19; 525/432, 436
See application file for complete search history.

(56) References Cited

U.S. PATENT DOCUMENTS

| | | | | |
|---|---|---|---|---|
| 4,948,400 A * | 8/1990 | Yamada et al. | ................... | 96/10 |
| 5,055,116 A * | 10/1991 | Kohn et al. | ........................ | 95/47 |
| 5,202,411 A * | 4/1993 | Itatani | ........................... | 528/353 |
| 5,391,219 A * | 2/1995 | Matsumoto et al. | ............... | 95/51 |
| 6,464,755 B2 * | 10/2002 | Nakanishi et al. | ................. | 95/52 |

FOREIGN PATENT DOCUMENTS

JP    03-267130    11/1991
(Continued)

OTHER PUBLICATIONS

Oct. 16, 2007 International Search Report in corresponding JP application PCT/JP2007/064468.

*Primary Examiner* — Richard Crispino
*Assistant Examiner* — Elizabeth Royston
(74) *Attorney, Agent, or Firm* — Young & Thompson

(57) ABSTRACT

A polyimide film made of a multicomponent polyimide comprising two or more different polyimide components including (A) a polyimide component A being raw materials of a polyimide A and/or a polyimidation product of the raw materials and (B) a polyimide component B being raw materials of a polyimide B and/or a polyimidation product of the raw materials. The polyimide components A and B are different, for example, such that the absolute difference between solubility parameter $SP_A$ of the polyimide A and solubility parameter $SP_B$ of the polyimide B, $|SP_B-SP_A|$, is 0.5 MPa$^{1/2}$ or more. The polyimide film has markedly modified surface properties as compared with a polyimide film in which all the same raw materials as used in the film of the invention are randomly bonded to one another.

9 Claims, 7 Drawing Sheets

FOREIGN PATENT DOCUMENTS

| | | |
|---|---|---|
| JP | 04-253931 | 9/1992 |
| JP | 05-001160 | 1/1993 |
| JP | 05-112481 | 5/1993 |
| JP | 2003-192811 | 7/2003 |
| JP | 2005-125721 | 5/2005 |
| JP | 2005-146074 | 6/2005 |
| JP | 2006-224097 | 8/2006 |
| JP | 2006-224098 | 8/2006 |

* cited by examiner

[Fig. 1]
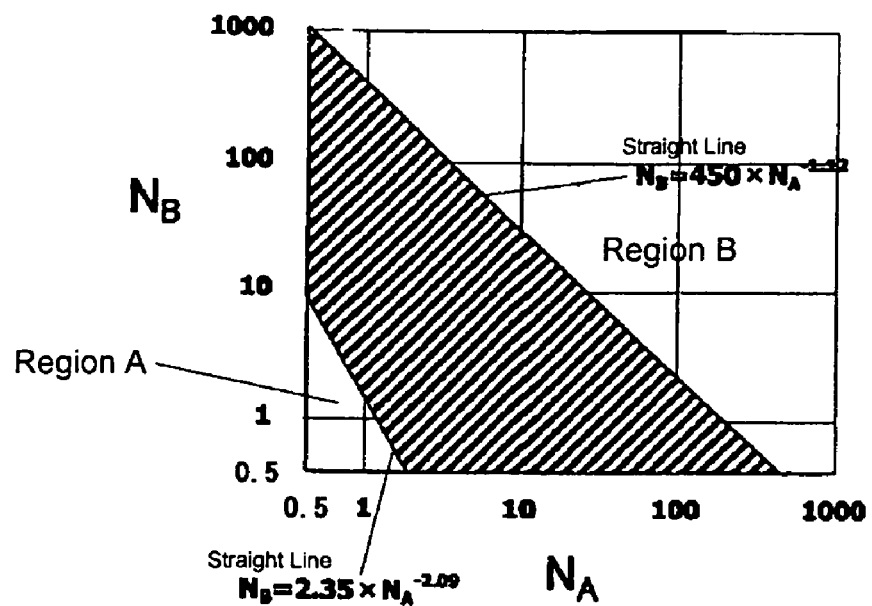
[Fig. 2]
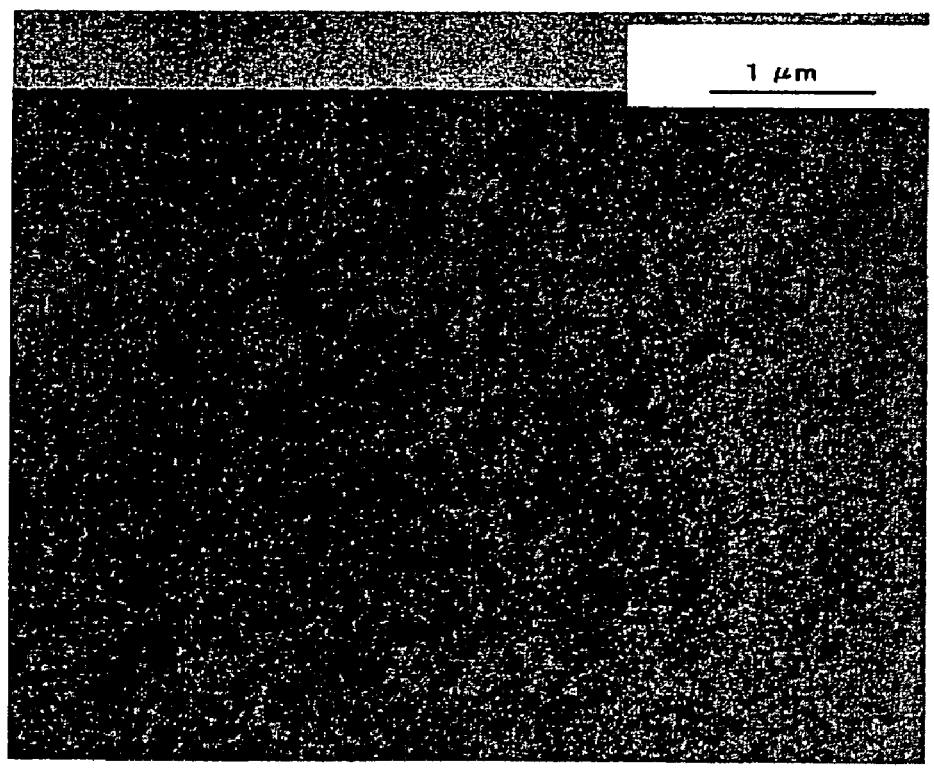

[Fig. 3]
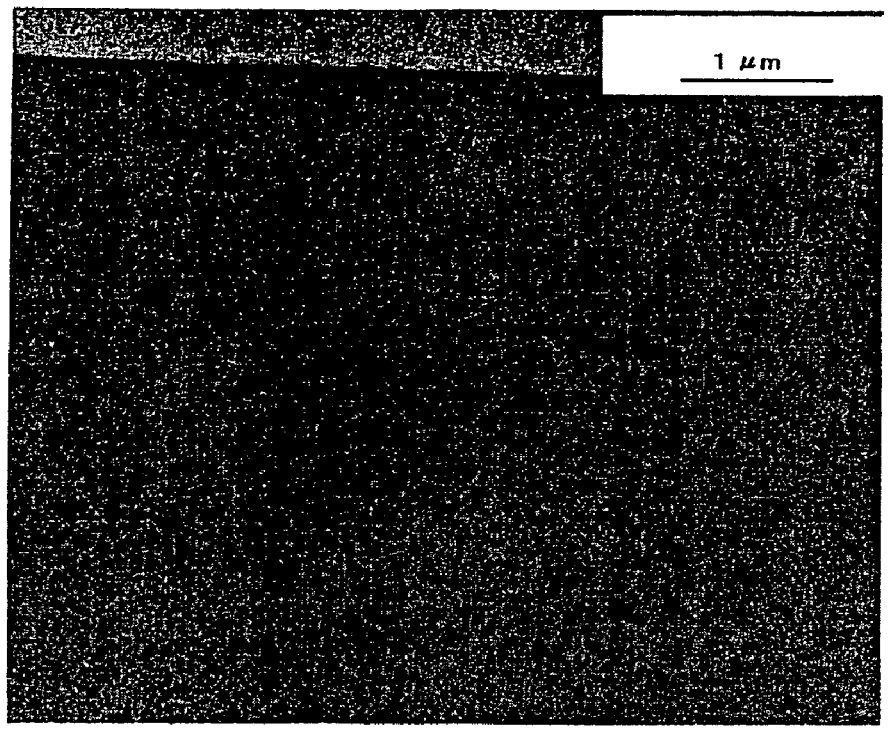
[Fig. 4]
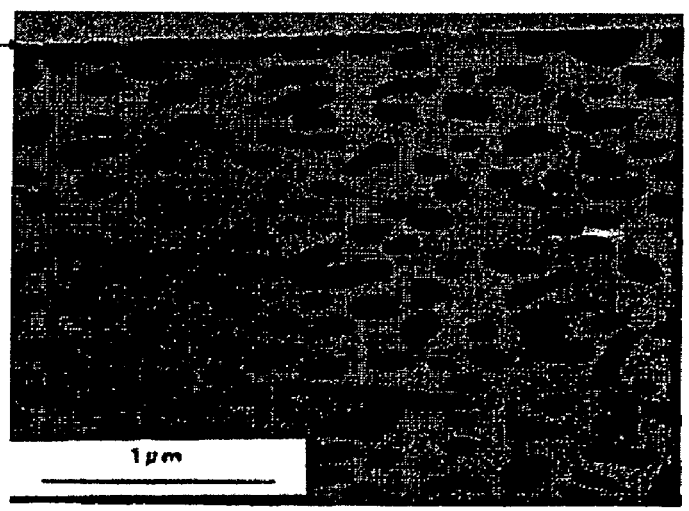

[Fig. 5]
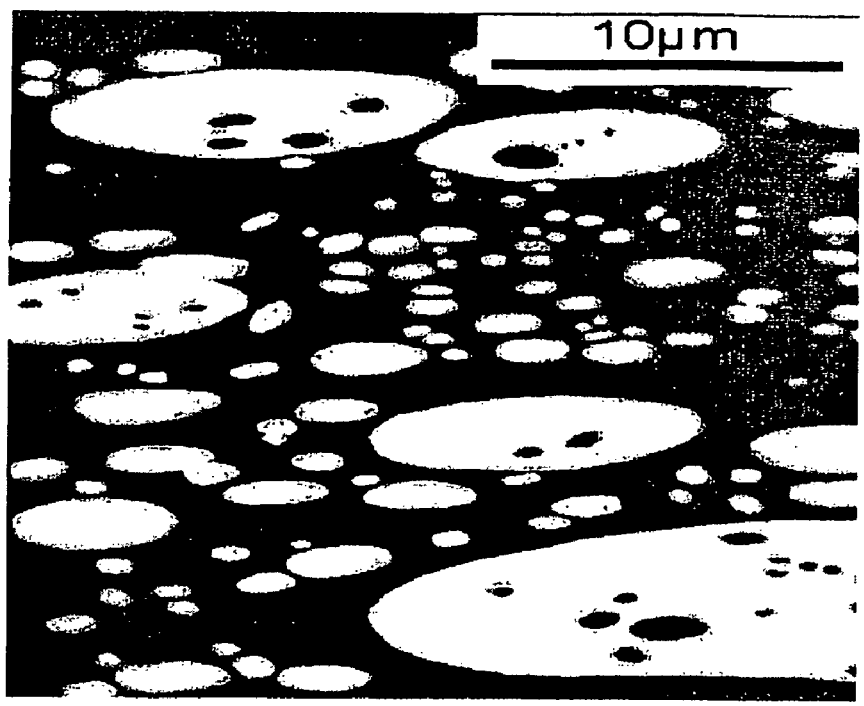
[Fig. 6]
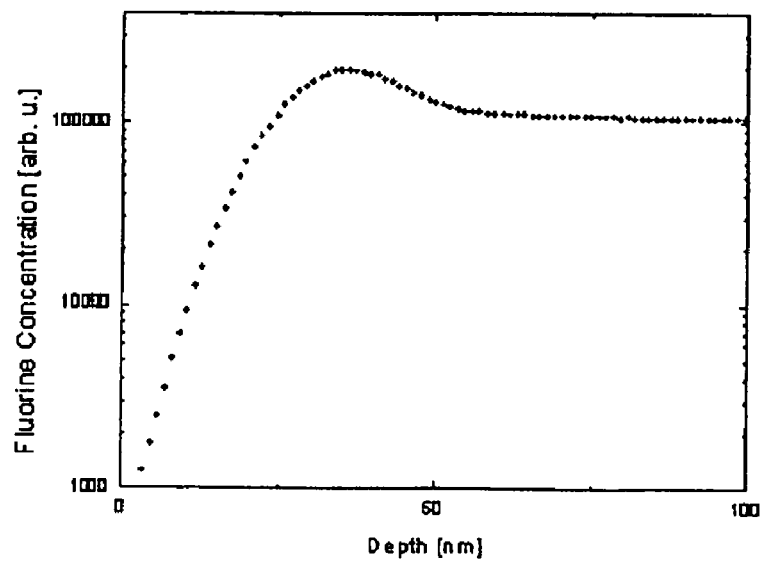

[Fig. 7]
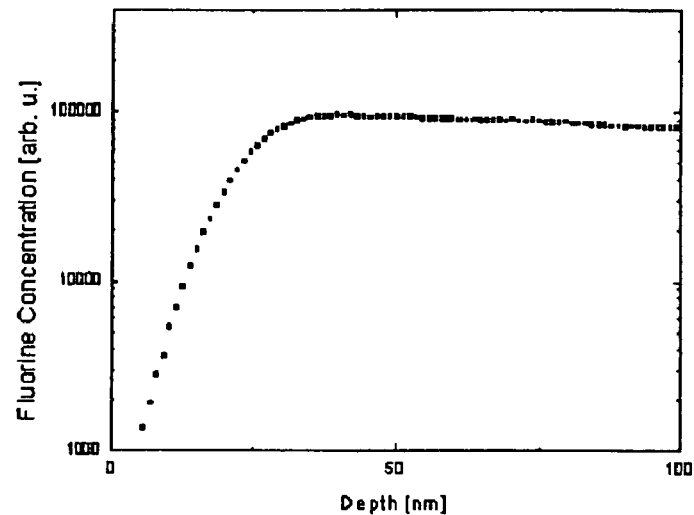
[Fig. 8]
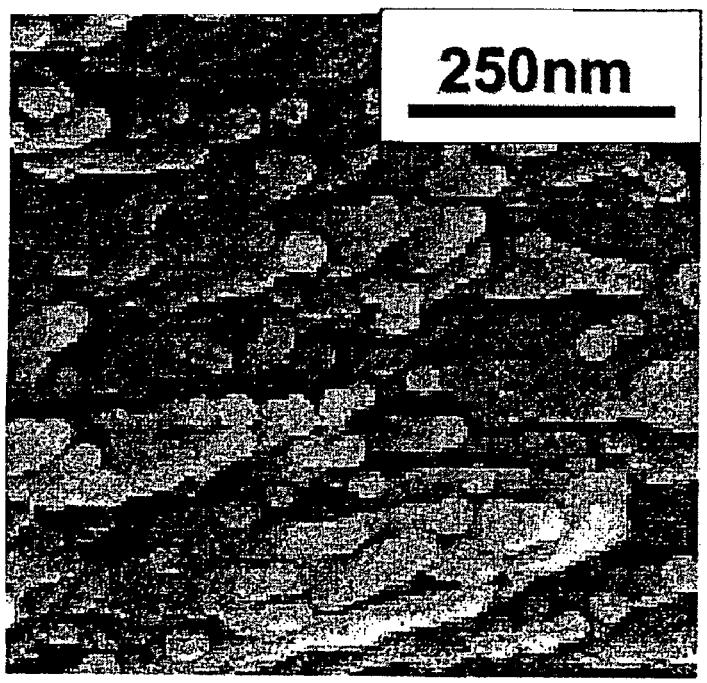
Freeze-fractured Surface of Film of Example 1
(average size $\lambda$ of condensed structure: 39 nm)

[Fig. 9]
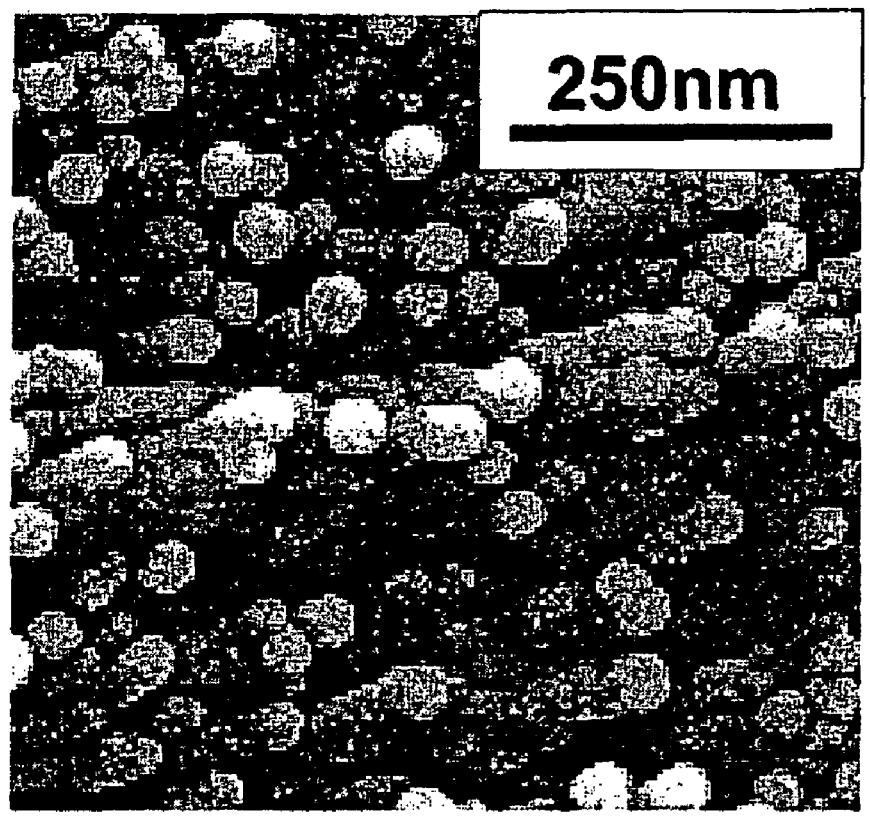
Freeze-fractured Surface of Film of Comparative Example 1
(average size λ of condensed structure: 57 nm)

[Fig. 10]
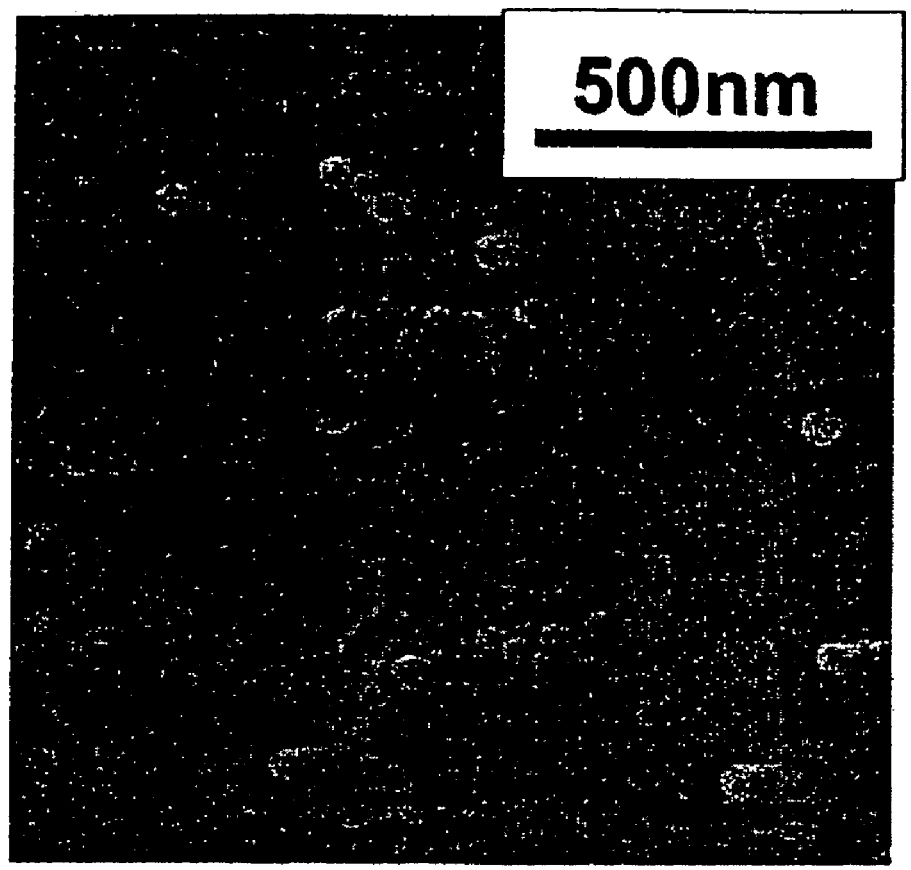
Freeze-fractured Surface of Film of Example 10
(average size λ of condensed structure: 47 nm)

[Fig. 11]
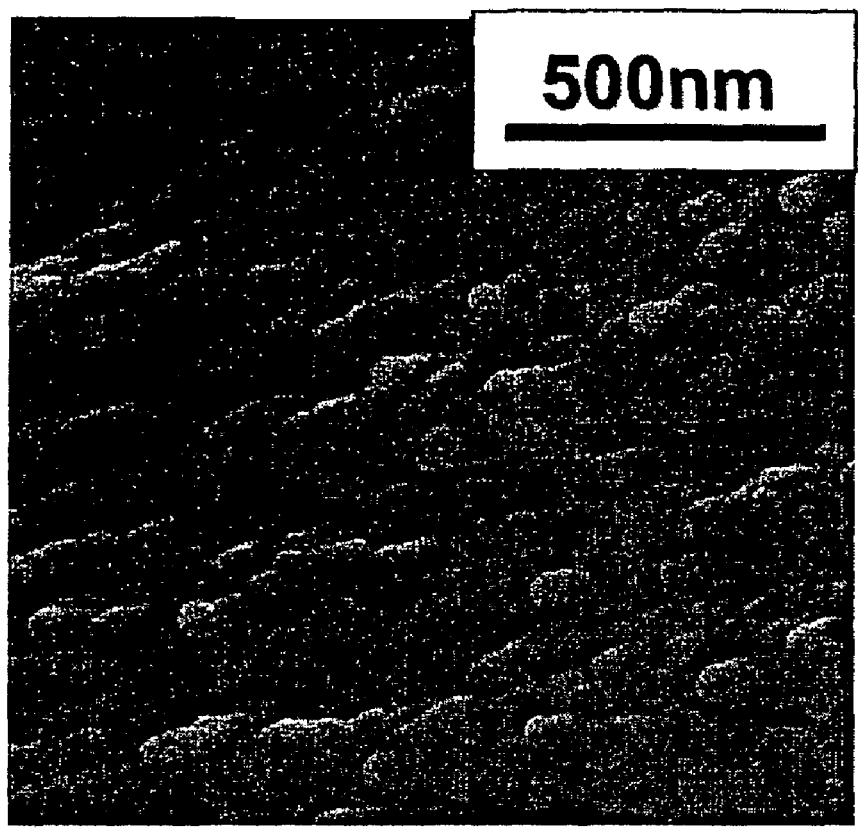
Freeze-fractured Surface of Film of Comparative Example 10
(average size λ of condensed structure: 72 nm)

POLYIMIDE FILM MADE OF MULTICOMPONENT POLYIMIDE AND PROCESS OF PRODUCING THE SAME

TECHNICAL FIELD

This invention relates a polyimide film made of a multicomponent polyimide and a process of producing the same. The polyimide film of the invention is characterized by having, for example, a controlled proportion of a fluorine-containing polyimide in a surface layer thereof, a greatly changed surface tension compared with a surface tension of a polyimide film in which raw material components are randomly bonded to one another, and greatly improved mechanical properties over a polyimide film in which raw material components are randomly bonded to one another.

BACKGROUND ART

Polyimide finds wide use in a variety of industrial fields because of its excellent heat resistance and mechanical characteristics. In actual applications of polyimide, modification of its surface properties, such as adhesiveness and wettability, is of frequent concern. Surface modification methods proposed for polyimide films include corona discharge treatment, plasma treatment, sand blasting, and chemical etching. For example, Patent Document 1 discloses a discharge treatment of the surface of a polyimide film. Patent Document 2 discloses a polyimide film laminated with a metal foil prepared by using a vacuum plasma treated polyimide film. Patent Document 3 proposes surface modification by applying a surface modifier to a polyimide film.

Patent Document 4 proposes a polyimide film having a specific chemical composition thereby exhibiting improved adhesive strength.

Patent Document 1: JP 5-1160A
Patent Document 2: JP 2005-125721A
Patent Document 3: JP 2003-192811 A
Patent Document 4: JP 2005-146074A

DISCLOSURE OF THE INVENTION

Problem to be Solved by the Invention

The present invention is contemplated to provide a multicomponent polyimide film with improved surface properties and mechanical properties compared with a polyimide film having the same raw material components randomly bonded; and a process of producing the multicomponent polyimide film.

Means for Solvent the Problem

The present invention relates to a polyimide film made of a multicomponent polyimide comprising (A) a polyimide component A comprising raw materials of a polyimide A and/or a polyimidation product of the raw materials and (B) a polyimide component B comprising raw materials of a polyimide B and/or a polyimidation product of the raw materials, the absolute difference between solubility parameter $SP_A$ of the polyimide A and solubility parameter $SP_B$ of the polyimide B, $|SP_B-SP_A|$, being 0.5 $\text{MPa}^{1/2}$ or more, wherein the polyimide film has a surface tension γ satisfying the relation: $|\gamma-\gamma_{rand}|>0.3$ mN/m, wherein $\gamma_{rand}$ is a surface tension of a film obtained by random polymerization of all the raw materials, on at least one side thereof and has no macrophase separation.

The present invention relates to a polyimide film made of a multicomponent polyimide comprising (A) a polyimide component A comprising raw materials of a polyimide A and/or a polyimidation product of the raw materials and (B) a polyimide component B comprising raw materials of a polyimide B and/or a polyimidation product of the raw materials, the ratio of elastic modulus $E_B$ of a film of the polyimide B to elastic modulus $E_A$ of a film of the polyimide A, $E_B/E_A$, being 1.05 or higher, wherein the polyimide film has an elastic modulus E satisfying the relation: $E/E_{rand}>1.005$, wherein $E_{rand}$ is an elastic modulus of a film obtained by random polymerization of all the raw materials, and has no macrophase separation.

The present invention relates to a polyimide film made of a multicomponent polyimide comprising (A) a polyimide component A comprising raw materials of a polyimide A and/or a polyimidation product of the raw materials and (B) a polyimide component B comprising raw materials of a polyimide B and/or a polyimidation product of the raw materials, the absolute difference between glass transition temperature $Tg_A$ of the polyimide A and glass transition temperature $Tg_B$ of the polyimide B, $|Tg_B-Tg_A|$, being 20° C. or more, wherein the polyimide film has an elastic modulus E satisfying the relationship: $E/E_{rand}>1.005$, wherein $E_{rand}$ is an elastic modulus of a film obtained by random polymerization of all the raw materials, and has no macrophase separation.

The present invention relates to a polyimide film made of a multicomponent polyimide comprising (A) a polyimide component A comprising raw materials of a polyimide A and/or a polyimidation product of the raw materials and (B) a polyimide component B comprising raw materials of a polyimide B and/or a polyimidation product of the raw materials, the absolute difference between solubility parameter $SP_A$ of the polyimide A and solubility parameter $SP_B$ of the polyimide B, $|SP_B-SP_A|$, being 0.5 $\text{MPa}^{1/2}$ or more, and the ratio of elastic modulus $E_B$ of a film of the polyimide B to elastic modulus $E_A$ of a film of the polyimide A, $E_B/E_A$, being 1.05 or higher, wherein the polyimide film has an elastic modulus E satisfying the relation: $E/E_{rand}>1.005$, wherein $E_{rand}$ is an elastic modulus of a film obtained by random polymerization of all the raw materials, and a surface tension γ satisfying relation: $|\gamma-\gamma_{rand}|>0.3$ mN/m, wherein $\gamma_{rand}$ is a surface tension of a film obtained by random polymerization of all the raw materials, on at least one side thereof, and has no macrophase separation.

The present invention relates to a polyimide film made of a multicomponent polyimide containing a fluorine atom, the film having a ratio of a fluorine concentration $\Phi_s$ of at least one surface thereof to the average fluorine concentration f of the whole film, $\Phi_s/f$, of 1.3 to 3 as measured by X-ray photoelectron spectroscopy.

The present invention relates to a polyimide film made of a multicomponent polyimide containing a fluorine atom, the film having a ratio of fluorine concentration $\Phi_S$ of at least one surface of the film to fluorine concentration $\Phi_{S'rand}$ of a surface of a film obtained by random copolymerization of all the raw materials, $\Phi_S/\Phi_{S'rand}$, of 1.1 to 2.6, preferably 1.2 to 2.4, as measured by X-ray photoelectron spectroscopy.

The present invention relates to a polyimide film made of a multicomponent polyimide containing a silicon atom, the film having a ratio of silicon concentration $\Phi_S$ of at least one surface of the film to silicon concentration $\Phi_{S'rand}$ of a surface of a film obtained by random copolymerization of all the raw materials, $\Phi_S/\Phi_{S'rand}$, of 1.1 to 4 as measured by X-ray photoelectron spectroscopy.

The present invention relates to the above described polyimide film, which is a very thin film with a thickness of less than 10 μm and not less than 10 nm.

The present invention relates to a process of producing a polyimide film of a multicomponent polyimide comprising the steps of:

(1) mixing a polyimide component A and a polyimide component B to prepare a multicomponent polyimide blend solution, the polyimide component A being raw materials of a polyimide A and/or a polyimidation product of the raw materials, and the polyimide component B being raw materials of a polyimide B and/or a polyimidation product of the raw materials, the polyimide components A and B being combined to satisfy the relation:

$$2.35 \times N_A^{-2.09} < N_B < 450 \times N_A^{-1.12},$$

where $N_A$ is the number averaged polymerization degree of the polyimide component A; and $N_B$ is the number averaged polymerization degree of the polyimide component B; provided that the degree of polymerization of each of unreacted polyimide raw materials, a tetracarboxylic acid component and a diamine component, is taken as 0.5, (2) subjecting the multicomponent polyimide blend solution to further polyimidation reaction, and (3) removing a solvent from a film of the multicomponent polyimide obtained in is step (2).

The present invention relates to the process, wherein the absolute difference between solubility parameter $SP_A$ of the polyimide A and solubility parameter $SP_B$ of the polyimide B, $|SP_B-SP_A|$, is 0.5 $MPa^{1/2}$ or more.

The present invention relates to the process, wherein the ratio of elastic modulus $E_B$ of a film of the polyimide B to elastic modulus $E_A$ of a film of the polyimide A, $E_B/E_A$, is 1.05 or higher.

The present invention relates to the process, wherein glass transition temperature $Tg_A$ of the polyimide A is higher than glass transition temperature $Tg_B$ of the polyimide B by 20° C. or more.

The present invention relates to the process, wherein the polyimide A contains a fluorine atom in its chemical structure.

The present invention relates to the process, wherein the polyimide B does not contain a fluorine atom in its chemical structure.

The present invention relates to the process, wherein the polyimide B has a tensile elongation at break of 4% or more.

The present invention relates to the process, wherein the polyimide A contains a silicon atom in its chemical structure.

The present invention relates to the process, wherein the polyimide B does not contain a silicon atom in its chemical structure.

According to the present invention, a polyimide film can be obtained from a multicomponent polyimide without undergoing macrophase separation. The polyimide film of the invention exhibits greatly improved surface properties and mechanical properties over a polyimide film having all the raw materials bonded at random.

BRIEF DESCRIPTION OF THE DRAWING

FIG. 1 is a graph illustrative of the combination range of $N_A$ and $N_B$ specified in the present invention.

FIG. 2 is a TEM micrograph of a cross-section of the polyimide film obtained in Example 1.

FIG. 3 is a TEM micrograph of a cross-section of the polyimide film obtained in Comparative Example 1.

FIG. 4 is a TEM micrograph of a cross-section of the polyimide film obtained in Comparative Example 4.

FIG. 5 is a TEM micrograph of a cross-section of the polyimide film obtained in Comparative Example 5.

FIG. 6 is the results of dSIMS analysis for fluorine in the thickness direction of a film obtained by casting a multicomponent polyimide blend solution on a glass substrate, followed by drying in Example 6.

FIG. 7 is the results of dSIMS analysis for fluorine in the thickness direction of a film obtained by casting a multicomponent polyimide solution on a glass substrate, followed by drying in Comparative Example 6.

FIG. 8 is an FE-SEM micrograph of a cross-section of the polyimide film obtained in Example 1.

FIG. 9 is an FE-SEM micrograph of a cross-section of the polyimide film obtained in Comparative Example 1.

FIG. 10 is an FE-SEM micrograph of a cross-section of the polyimide film obtained in Example 10.

FIG. 11 is an FE-SEM micrograph of a cross-section of the polyimide film obtained in Comparative Example 10.

BEST MODE FOR CARRYING OUT THE INVENTION

The process of producing a polyimide film made of a multicomponent polyimide composed of two polyimide components having different repeating units, i.e., a polyimide A and a polyimide B will be described first with particular reference to an embodiment in which the polyimide A contains fluorine in its chemical structure while the polyimide B does not.

As used herein, the term "polyimide component" means a component comprising raw materials of a polyimide (including an unreacted tetracarboxylic acid component and an unreacted diamine component) and/or a polyimidation product of the raw materials. The term "polyimidation product" as used herein does not necessary mean a polymer having a high degree of polymerization but is intended to include a monomer and an oligomer having a low polymerization degree that are produced in the initial stage of polyimidation of the raw materials of the polyimide. That is, a polyimidation product comprises a monomer (i.e., an imidation product between one molecule of a tetracarboxylic acid component and one molecule of a diamine component) and/or a polymer (i.e., an imidation product of more than 2 molecules, in total, of a tetracarboxylic acid component and a diamine component).

The degree of polymerization of a polyimidation product, as referred to in the invention, is defined to be the number of repeating units of a polyimide present in the product. A monomer has a polymerization degree of 1, and a polymer has a polymerization degree>1. Having no repeating unit, the polymerization degree of each raw material of a polyimide is defined to be 0.5. A number averaged polymerization degree is calculated on the basis of the above-defined polymerization degrees.

The polyimide component A comprises raw materials of a polyimide A (i.e., an unreacted tetracarboxylic acid component and an unreacted diamine component) and/or a polyimidation product of the raw materials. The polyimide component B comprises raw materials of a polyimide B (i.e., an unreacted tetracarboxylic acid component and an unreacted diamine component) and/or a polyimidation product of the raw materials.

When the polyimide components A and B in both of which the tetracarboxylic acid component and the diamine component are in their unreacted state (both having a polymerization degree of 0.5) are mixed and subjected to polyimidation reaction, there is produced a polyimide mainly comprising a random copolymer in which the polyimide components A and B are bonded with considerable randomness. In the present invention a polyimide resulting from such random copolyimidation is called a polyimide in which all the raw materials of the polyimide are random-polymerized. When a solution of such a polyimide is cast on a substrate to form a coating film and dried to remove the solvent to provide a polyimide film, the chemical composition of a surface layer of the resulting polyimide film is practically equal to the average chemical composition of the whole film, with no localization of fluorine-containing polyimide on the surface.

When the polyimide A and the polyimide B are separately obtained by polyimidation, and the resulting polyimides A and B both having a high degree of polymerization are blended, it is usually difficult to prepare a uniform blend solution. A uniform blend solution could be prepared and remain nearly uniform for a very short time, but it is not easy to maintain the uniformity for a long time enough to carry out film formation in a stable manner. Where a blend solution containing a plurality of polyimides having high degrees of polymerization is cast on a substrate to form a coating film, followed by solvent removal, the solution undergoes rapid progress of macrophase separation due to repulsive interaction between the polyimides having differences in chemical properties even though it is slight. As referred to herein, the term "macrophase separation" denotes phase separation between different polyimides resulting in forming domains of a polyimide of 0.1 μm or greater, not infrequently of 1 μm or greater, in maximum diameter in a matrix of a different polyimide. A macrophase separation structure is observable as clearly delineated domains in a transmission electron microscope (TEM) photograph. If macrophase separation occurs, the film appears a cloudy tone, and it is difficult to obtain a film in a stable manner. A cloudy film is often impractical because of the difficulty to see through it.

The polyimide film of the invention has no macrophase separation. To say "no macrophase separation" means that there is observed no domains of 1 μm or greater, preferably 0.1 μm or greater, in maximum diameter. Therefore, the polyimide film of the invention has no cloudiness when observed with the naked eye. Cloudiness may be evaluated in terms of haze. The polyimide film of the invention preferably has a haze of less than 50%, more preferably 30% or less, even more preferably 4% or less.

The process of producing a polyimide film according to the invention is characterized by using the above-described multicomponent polyimide blend solution in film formation by, for example, solvent casting. While the solvent is removed from the cast solution by drying, phase separation between different polyimides takes place to form a surface layer enriched by a fluorine-containing polyimide when the film is observed in its cross-section (in the direction perpendicular to the surface of the film). Since the phase separation between different polyimides is to proceed in the step of solvent removal by drying, it is desirable that the multicomponent polyimide blend solution is homogeneous at least when observed with the naked eye. A multicomponent polyimide blend solution having phase separation is not suited for use in the present invention.

In a more preferred embodiment of the process, a multicomponent polyimide blend solution containing a block copolymer with a predetermined polymerization degree is prepared, thereafter the solution is used to manufacture films by, for example, solvent casting. When such a multicomponent polyimide blend solution cast on a substrate is dried to be freed of the solvent, macrophase separation does not occur but what we call "microphase separation" proceeds. Phase separation resulting in formation of domains of different polyimides (macrophase separation) is not observed. It is considered that microdomains having the size in the range of few nanometers to about 0.1 μm are formed in the drying step, but the boundaries of the domains are unclear as a whole to provide a structure in which different polyimides do not attain complete phase separation and are mostly present in vaguely-delineated regions. During the stage of this phase separation, a surface layer enriched by fluorine-containing polyimide is formed when viewed in the thickness direction of the film (in the direction perpendicular to the surface of the film) without causing macroscopic fluctuation in the polyimide composition in an in-plane direction of the film (in a direction parallel to the surface of the film). The preferred embodiment of the invention therefore provides a process of producing a polyimide film made of a multicomponent polyimide, in which phase separation between different polyimides is controlled so as to cause microphase separation between different polyimides while preventing the microphase separation from growing to macrophase separation, whereby to form an improved polyimide film having different chemical and physical properties between its surface layer and inside (by the term "inside" is meant a region at a depth of about 10 nm or more from the film surface) without involving macroscopic heterogeneity that might have accompanied progress of macrophase separation.

The process of producing a polyimide film of a multicomponent polyimide according to the present invention includes the following steps 1 to 4, in which "polyimide component A" is raw materials of a polyimide A containing a fluorine atom in the chemical structure thereof and/or a polyimidation product of the raw materials; "polyimide component B" is raw materials of a polyimide B and/or a polyimidation product of the raw materials; the number averaged polymerization degree of the polyimide component A is designated by $N_A$; and the number averaged polymerization degree of the polyimide component B is designated by $N_B$.

Step 1: A polyimide component A and a polyimide component B are mixed to prepare a multicomponent polyimide blend solution, the polyimide component A and the polyimide component B being combined so as to satisfy relation (2):

$$2.35 \times N_A^{-2.09} < N_B \quad (2)$$

Step 2: The multicomponent polyimide blend solution is subjected to further polyimidation reaction.

Step 3: The multicomponent polyimide blend solution from step 2 is formed into film.

Step 4: The film of the multicomponent polyimide blend solution is dried to be freed of the solvent.

In a preferred embodiment of step 1, a polyimide component A and a polyimide component B to be mixed to prepare a multicomponent polyimide blend solution are selected to satisfy relation (1):

$$2.35 \times N_A^{-2.09} < N_B < 450 \times N_A^{-1.12} \quad (1)$$

The polyimide A containing a fluorine atom in its chemical structure is a polyimide derived from raw materials, i.e., a tetracarboxylic acid component and a diamine component, at least one of which contains a fluorine atom.

Examples of fluorine-containing tetracarboxylic acid components for making a polyimide A include, but are not limited to, 2,2-bis(3,4-dicarboxyphenyl) hexafluoropropane, 2,2'-bis(trifluoromethyl)-4,4',5,5'-biphenyltetracarboxylic acid, 4,4'-(hexafluorotrimethylene)diphthalic acid, 4,4'-(octafluorotetramethylene)diphthalic acid, and their dianhydride and esters. Preferred of them are 2,2-bis(3,4-dicarboxyphenyl) hexafluoropropane and its dianhydride (hereinafter abbreviated as 6FDA) and esters.

Examples of fluorine-containing diamine components for making a polyimide A include, but are not limited to, 2,2-bis (4-aminophenyl)hexafluoropropane, 2,2'-bis(trifluoromethyl)-4,4'-diaminobiphenyl, 2,2-bis[4-(4-aminophenoxy) phenyl]hexafluoropropane, and 2-trifluoromethyl-p-phenylenediamine.

These fluorine-containing raw materials may be used either individually or as a mixture of two or more thereof or in combination with a fluorine-free monomer component. It is preferred that either the tetracarboxylic acid component or the diamine component comprise a fluorine-containing raw material in a major proportion (i.e., a proportion of 50 mol % or more, usually 55 mol % or more).

Where a fluorine-containing tetracarboxylic acid component is a major tetracarboxylic acid component to make polyimide A, aromatic diamines and aliphatic diamines used to make known polyimides can be used in combination. Examples of suitable diamine components are aromatic diamines, such as p-phenylenediamine, m-phenylenediamine (hereinafter abbreviated as MPD), 4,4'-diaminodiphenyl ether (hereinafter abbreviated as DADE), 4,4'-diaminodiphenylmethane, 3,3'-dimethyl-4,4'-diaminodiphenylmethane, 3,3',5,5'-tetramethyl-4,4'-diaminodiphenylmethane, 3,3'-dichloro-4,4'-diaminodiphenylmethane, dimethyl-3,7-diaminodibenzothiophene-5,5-dioxide (hereinafter abbreviated as TSN; TSN is usually available in the form of a mixture having 2,8-dimethyl-3,7-diaminodibenzothiophene-5,5-dioxide as a main component and containing isomers with a methyl group(s) bonded at different positions, e.g., 2,6-dimethyl-3,7-diaminodibenzothiophene-5,5-dioxide and 4,6-dimethyl-3,7-diaminodibenzothiophene-5,5-dioxide), 2,2-bis[4-(4-aminophenoxy)phenyl]propane, 3,3'-dihydroxy-4,4'-diaminodiphenyl, 3,3'-dicarboxy-4,4'-diaminodiphenyl, 3,3'-dicarboxy-4,4'-diaminodiphenylmethane, 3,3',5,5'-tetrachloro-4,4'-diamino diphenyl, diaminonaphthalene, 2,4-dimethyl-m-phenylenediamine, 3,5-diaminobenzoic acid (hereinafter abbreviated as DABA), 3,3'-diaminodiphenylsulfone (hereinafter abbreviated as MASN), 4,4'-diaminobenzophenone, 3,3'-diaminobenzophenone, 4,4'-diaminodipehnylsulfone, 1,3-bis(4-aminophenoxy)benzene, and 1,4-bis(4-aminophenoxy)benzene.

Examples of tetracarboxylic acid components that can be combined with a fluorine-containing diamine component for making polyimide A include, but are not limited to, pyromellitic acid, benzophenonetetracarboxylic acid, naphthalenetetracarboxylic acid, bis(dicarboxyphenyl)ether, bis(dicarboxyphenyl) sulfone, 2,2-bis(dicarboxyphenyl)propane, 2,3, 3',4'-biphenyltetradarboxylic acid, 2,2',3,3'-biphenyltetracarboxylic acid, 3,3',4,4'-biphenyltetracarboxylic acid, and their anhydride and esters. Particularly preferred of them is 3,3',4,4'-biphenyltetracarboxylic acid dianhydride (hereinafter abbreviated as s-BPDA).

Suitable raw materials for a polyimide B are such that a film obtained from the resulting polyimide B has a tensile strength of 100 MPa or more, preferably 150 MPa or more, and a tensile elongation at break of 10% or more, preferably 15% or more. Since polyimide having a fluorine atom in its chemical structure has relatively low mechanical strength, it is preferred for both the monomer components providing polyimide B, i.e., a tetracarboxylic acid component and a diamine component, not to comprise a fluorine-containing component in a major proportion. It is more preferred for both the monomer components to be free of fluorine to make a polyimide film with excellent mechanical characteristics.

Examples of tetracarboxylic acid components of a polyimide B include, but are not limited to, pyromellitic acid, benzophenonetetracarboxylic acid, naphthalenetetracarboxylic acid, bis(dicarboxyphenyl)ether, bis(dicarboxyphenyl) sulfone, 2,2-bis(dicarboxyphenyl)propane, 2,3,3',4'-biphenyltetracarboxylic acid, 2,2',3,3'-biphenyltetracarboxylic acid, 3,3',4,4'-biphenyltetracarboxylic acid, and their anhydride and esters. Particularly preferred of them is 3,3',4,4'-biphenyltetracarboxylic acid dianhydride.

These tetracarboxylic acid components can be used either individually or as a mixture of two or more thereof or in combination with a small amount of a fluorine-containing tetracarboxylic acid component. For example, it is acceptable that one mole of s-BPDA is combined with not more than 0.3 moles of 6FDA.

Suitable diamine components of a polyimide B include those listed above as diamine components that can be used to make the polyimide A.

In step 1 of the process of the invention, a multicomponent polyimide blend solution is prepared by mixing (A) a polyimide component A having a number averaged degree of polymerization $N_A$ and comprising raw materials of a polyimide A containing a fluorine atom in its chemical structure and/or a polyimidation product of the raw materials and (B) a polyimide component B having a number averaged degree of polymerization $N_B$ and comprising raw materials of a polyimide B and/or a polyimidation product of the raw materials. The $N_A$ and $N_B$ satisfy relation (2), preferably relation (1). The range of the $N_A/N_B$ combination that satisfies relations (2) or (1) is graphically shown in FIG. 1. The region to the right and above the straight line $N_B = 2.35 \times N_A^{-2.09}$ satisfies relation (2). In the above-defined region, the part that is to the left and below the straight line $N_B = 450 \times N_A^{-1.12}$ (i.e., the shaded region) satisfies relation (1). The degree of polymerization of each of the polyimide raw materials (i.e., unreacted tetracarboxylic acid component(s) and unreacted diamine component(s)) being defined to be 0.5, $N_A$ and $N_B$ are at least 0.5.

In step 2, the multicomponent polyimide blend solution is subjected to further polyimidation reaction to give a blend solution containing the polyimide component A and the polyimide component B both having been further polyimidated. The resulting multicomponent polyimide blend solution contains at least a polymer from the polyimide A component and a polymer from the polyimide B component and, in addition, a di- or multi-block copolymer having the polyimide component A and the polyimide component B bonded to each other at their ends, the multicomponent polyimide blend having acquired an appropriate degree of polymerization.

The term "diblock copolymer" denotes a copolymer consisting of one block composed of a polyimide component A and one block composed of a polyimide component B bonded each other at their end. The term "multiblock copolymer" denotes a copolymer consisting of the diblock copolymer and at least one block of either kind bonded to one or both ends of the diblock copolymer. The di- or multiblock copolymer can contain a chain of blocks of a polyimide component A or a chain of blocks of a polyimide component B.

The description goes into further detail by referring to FIG. 1.

If polyimide components A and B whose $N_A$ and $N_B$ are in region A in the graph of FIG. 1 are mixed in step 1, and the resulting multicomponent polyimide blend solution is polyimidated in step 2, neither blocks consisting solely of the polyimide component A nor blocks consisting solely of the polyimide component B are formed, and the result is a copolymer having the polyimide components A and B distributed with high randomness (a random copolyimide).

When polyimide components A and B whose $N_A$ and $N_B$ are in region B in the graph of FIG. 1 are mixed in step 1, and the resulting multicomponent polyimide blend solution is polyimidated in step 2, a multicomponent polyimide blend solution containing a block copolymer could be obtained. However, because of too high the degree of polymerization of the block copolymer, strong repulsive interactions between the polyimide blocks easily result in macrophase separation. Macrophase separation therefore tends to occur in region B of FIG. 1. In region B, although the surface modifying effect of the invention by increasing the fluorine concentration of the film surface is achieved, the casting layer tends to undergo macroscopic fluctuation in polyimide composition in an in-plane direction (a direction parallel to the surface of the film). As a result, the above-described effect, for example, the surface tension controlling effect may be shown but is liable to be insufficient.

Within the range of $N_A/N_B$ combination satisfying relation 1 (the shaded region in FIG. 1), there is obtained a multicomponent polyimide blend solution containing at least a polymer from the polyimide component A and a polymer from the polyimide component B and, in addition, a di- or multi-block copolymer having blocks in which the polyimide component A and the polyimide component B bonded end-to-end and, as a whole, having an appropriate degree of polymerization. It is possible with the resulting multicomponent polyimide to achieve controlled phase separation, what we may call microphase separation, while inhibiting macrophase separation that might be caused by repulsive interactions. The resulting polyimide film has a fluorine-containing polyimide-rich surface layer when viewed in a cross-sectional direction of the film (the direction perpendicular to the surface of the film) without involving macroscopic fluctuation in polyimide composition when viewed in an in-plane direction (a direction parallel to the film surface). This makes it more convenient to control the surface properties of the polyimide film.

Step 1 is the step in which a polyimide component A comprising raw materials of a polyimide A containing a fluorine atom in its chemical structure and/or a polyimidation product of the raw materials and a polyimide component B comprising raw materials of a polyimide B and/or a polyimidation product of the raw materials, the number averaged degree of polymerization of the polyimide component A ($N_A$) and the number averaged degree of polymerization of the polyimide component B ($N_B$) satisfying relationship 1 or 2, are mixed to prepare a multicomponent polyimide blend solution. The manner of effecting step 1 is not particularly limited as long as a multicomponent polyimide blend solution is obtained. For example, raw materials of a polyimide A and raw materials of a polyimide B are separately prepared, if necessary by polyimidation reaction and uniformly mixed to obtain a multicomponent polyimide blend solution. When either one of the polyimide components is a mixture of raw materials (i.e., an unreacted tetracarboxylic acid component and an unreacted diamine component), the raw materials of the other polyimide component can be polyimidated to prepare a polyimide solution having a prescribed number averaged degree of polymerization. To the polyimide solution may be added the unreacted tetracarboxylic acid component and the unreacted diamine component as the first mentioned polyimide component to give a multicomponent polyimide blend solution. Considering that a polyimide B having a higher degree of polymerization is more advantageous to improve the mechanical strength of the film, it is advantageous that the raw materials of a polyimide B are polyimidated in a polar solvent to prepare a polyimide B with an appropriate degree of polymerization, into which the raw materials of a polyimide A are mixed to prepare a multicomponent polyimide blend solution in step 1.

Polyimidation reaction for obtaining polyimide is described below. Polyimidation reaction is carried out conveniently by allowing a tetracarboxylic acid component and a diamine component to react at a predetermined ratio in a polar solvent at 120° C. or higher, preferably 160° C. or higher, and not higher than the boiling point of the solvent, whereby polyamic acid is formed, followed by dehydration and ring closure to form an imide bond. In order to achieve a prescribed degree of polymerization, the reaction temperature may be lowered than the recited range. Because a residual amic acid bond can undergo exchange reaction to impair the blockness of polyimide, the polyimidation reaction is preferably carried out to achieve an imidation ratio of at least 40%, more preferably until imidation substantially completes.

The polyimidation reaction between a tetracarboxylic acid component and a diamine component at a ratio close to 1 results in synthesis of polyimide with a relatively high molecular weight (a high number averaged degree of polymerization). Hence, when a polyimide having a relatively high molecular weight from the beginning is desired, it is preferred to cause a tetracarboxylic acid component and a diamine component to react at a molar ratio of 1:0.95 to 0.995 or 1:1.005 to 1.05, more preferably 1:0.98 to 0.995 or 1:1.005 to 1.02, to obtain a polyimide component having a relatively high molecular weight.

In the case of, for example, 6FDA as a tetracarboxylic acid component and TSN as a diamine component, dehydration and ring closure reaction using 1.02 mol of TSN per mole of 6FDA at 190° C. for 30 hours results in synthesis of a polyimide having a number averaged molecular weight of about 15000 to 25000 (corresponding to a number averaged degree of polymerization of about 20 to 40); and dehydration and ring closure reaction using 1.005 mol of TSN per mole of 6FDA at 190° C. for 30 hours results in synthesis of a polyimide having a number averaged molecular weight of about 30000 to 40000 (corresponding to a number averaged degree of polymerization of about 40 to 60).

In another example, where 6FDA and DABA are used as a tetracarboxylic acid component and a diamine component, respectively, dehydration and ring closure reaction using 1.02 mol of DABA per mole of 6FDA at 190° C. for 30 hours results in synthesis of a polyimide having a number averaged molecular weight of about 15000 to 25000 (corresponding to a number averaged degree of polymerization of about 25 to 45); and dehydration and ring closure reaction using 1.005 mol of DABA per mole of 6FDA at 190° C. for 30 hours results in synthesis of polyimide having a number averaged molecular weight of about 40000 to 50000 (corresponding to a number averaged degree of polymerization of about 70 to 90).

On the other hand, reaction between 1 mol of a tetracarboxylic acid component and 0.98 mol or less or 1.02 mol or more of a diamine component results in formation of a polyimide component tailored to have a relatively low molecular weight (a small is number averaged degree of polymerization).

The multicomponent polyimide blend solution obtained in step 1 preferably has a total diamine component to total tetracarboxylic acid component molar ratio (total number of moles of a diamine component(s)/total number of moles of a tetracarboxylic acid component(s)) ranging from 0.95 to 0.99 or from 1.01 to 1.05, more preferably from 0.96 to 0.99 or from 1.015 to 1.04. The recited total diamine component to total tetracarboxylic acid component molar ratio is advantageous for obtaining a multicomponent polyimide blend solution with an appropriate number averaged molecular weight or solution viscosity in step 2.

Step 2 is the step of subjecting the multicomponent polyimide blend solution obtained in step 1, which contains the polyimide component A and polyimide component B whose $N_A$ and $N_B$ satisfy relation (2), preferably relation (1), to further polyimidation reaction to prepare a multicomponent polyimide blend solution containing at least a polymer from the polyimide component A, a polymer from the polyimide component B and, in addition, a di- or multi-block copolymer having the polyimide component A and the polyimide component B bonded end-to-end and, as a whole, having an appropriate degree of polymerization.

Step 2 consists in subjecting the multicomponent polyimide blend solution obtained in step 1 to further polyimidation reaction. The above-described method for polyimidation can be adopted as appropriate.

If the multicomponent polyimide blend solution obtained in Steps 1 and 2 develops apparently obvious turbidity, the solution fails to form a uniform polyimide film. So, a polar solvent capable of uniformly dissolving multicomponent polyimide is used in the multicomponent polyimide blend solutions prepared in steps 1 and 2. The expression "uniformly dissolving" as used herein means that the solvent is capable of providing a solution free from macrophase-separated domains large enough to scatter visible light and free from apparently obvious turbidity. The solution may contain microphase-separated domains of sizes not so large as to cause visible light scattering. The solution is not indispensably required to be uniform on the molecular chain level.

Suitable polar solvents include, but are not limited to, phenol-based solvents, such as phenols, e.g., phenol, cresol, and xylenol, catechols having two hydroxyl groups on a benzene ring, and halogenated phenols, e.g., 3-chlorophenol, 4-chlorophenol (hereinafter abbreviated as PCP), 4-bromophenol, and 2-chloro-5-hydroxytoluene; amide solvents, such as N-methyl-2-pyrrolidone, N,N-dimethylformamide, N,N-dimethylacetamide, and N,N-diethylacetamide; and mixtures thereof.

The manner of the polyimidation reaction in step 2 is not particularly restricted as long as the reaction results in formation of a di- or multiblock copolymer having the polyimide components A and B joined end-to-end. Usually, formation of the di- or multiblock copolymer can conveniently be accomplished by conducting polymerization and imidation until the multicomponent polyimide blend solution increases its number averaged molecular weight preferably twice or more, more preferably five times or more. The multicomponent polyimide blend solution resulting from the polyimidation reaction of step 2 suitably has a number averaged degree of polymerization of 20 to 1000, preferably 20 to 500, more preferably 30 to 200. A polyimide blend solution with too small a number averaged degree of polymerization has too low a solution viscosity, which makes film formation in step 3 difficult, and the resulting polyimide film has reduced mechanical strength. A polyimide blend solution with too large a number averaged degree of polymerization is liable to macrophase separation and has too high a solution viscosity, which also makes film formation in step 3 difficult.

The solution viscosity (rotational viscosity) of the multicomponent polyimide blend solution obtained in step 2 is a characteristic requirement for shaping the solution into a prescribed film form and for stabilizing the film form. In the present invention, it is advisable to adjust the solution viscosity of the multicomponent polyimide blend solution in a range of 20 to 17000 poise, preferably 100 to 15000 poise, more preferably 200 to 10000 poise, at 100° C.

A multicomponent polyimide blend solution having an appropriate number averaged degree of polymerization and solution viscosity can easily be obtained by (1) preparing a multicomponent polyimide blend solution having a total diamine component to total tetracarboxylic acid component molar ratio (total number of moles of a diamine component(s)/total number of moles of a tetracarboxylic acid component(s)) ranging from 0.95 to 0.99 or from 1.01 to 1.05, more preferably from 0.96 to 0.99 or from 1.015 to 1.04 in step 1 and (2) further polyimidating the resulting blend solution in step 2.

Each of the multicomponent polyimide blend solutions of steps 1 and 2 usually has a polymer concentration of 5% to 40% by weight, preferably 8% to 25% by weight, more preferably 9% to 20% by weight.

Step 3 is a step in which the multicomponent polyimide blend solution obtained in step 2 is formed into film. Step 3 may be carried out by any method as long as the multicomponent polyimide blend solution is converted into film form. For example, the solution is cast on a substrate to form a coating layer or is extruded from a slit with a prescribed width into film without using a substrate. When a substrate is not used, the solution should have a high viscosity so as to provide a self-supporting extruded film. A layer of the solution cast on a substrate may be dried to partially remove the solvent, and when the layer becomes self-supporting, it may be peeled from the substrate.

In step 4, the film of the multicomponent polyimide blend solution as formed in step 3 is dried to be freed of the solvent to give a polyimide film. The solvent removal by drying is performed conveniently under pressure and temperature conditions commonly employed for solvent removal from a coating layer of a polyimide solution. For example, the film may be heated at a high temperature from the very beginning, and the temperature is elevated up to the maximum heating temperature, or the heating may start from a relatively low temperature of 140° C. or lower to remove the solvent, followed by raising the temperature up to the maximum heating temperature. The maximum heating temperature is in the range of 200° to 600° C., preferably 250° to 550° C., more preferably 280° to 450° C., in which temperature range the heating treatment is continued for 0.01 to 20 hours, preferably 0.01 to 6 hours, more preferably 0.01 to 5 hours. The heating treatment may be effected in an inert atmosphere, such as a nitrogen gas atmosphere. The treating system may be evacuated to reduced pressure to accelerate solvent removal.

In the present invention, when the plurality of polyimides undergo phase separation with the progress of the solvent removal by drying in step 4, the di- or multiblock copolymer having the polyimide component A and the polyimide component B bonded end-to-end functions as a kind of a surface active agent between a polymer of the polyimide component A and a polymer of the polyimide component B, which are incompatible with each other. To put it differently, the di- or multiblock copolymer is distributed along the interface between domains of the polyimide component A and domains of the polyimide component B, thereby screening out the repulsive interaction between the different domains to induce desired microphase separation while preventing macrophase separation from occurring.

Fluorine-containing polyimide is considered to hardly precipitate in the surface layer of a polyimide film because it is generally more soluble than fluorine-free polyimide. Nonetheless, because fluorine-containing polyimide has a low surface free energy, it is thermodynamically distributed more on the film surface thereby to minimize the enthalpy of the film surface. Fluorine-containing polyimide's existing in the surface layer of the polyimide film in a higher proportion is assumed attributed to this thermodynamic effect occurring in step 4.

One of the embodiments of the polyimide film according to the invention is a polyimide film made of multiple polyimides including a fluorine-containing polyimide, with the fluorine-containing polyimide existing in a higher proportion in the surface layer of the film. Seeing that the polyimide composition varies in the thickness direction, the polyimide film can be said to have a gradient structure in the vicinity of the film surface.

The gradient structure can be ascertained through dynamic secondary ion mass spectrometry (hereinafter abbreviated as dSIMS). dSIMS is a technique for elemental depth profiling, in which an $O_2^+$ ion beam is bombarded to the membrane surface to carry on sputter etching, and the secondary ions sputtered at various etching depths are mass analyzed. FIG. 6 is the results of depth profiling of fluorine concentration in a film from the surface to the inside (Atomica Dynamic SIMS4000; $O_2^+$ ion bombardment current: 15 nA/$\mu m^2$), the film formed by casting a multicomponent polyimide blend solution containing a di- or multiblock copolymer and having an appropriate degree of polymerization on a glass substrate and drying the cast film to remove the solvent, according to the process of the invention. In FIG. 6, the abscissa represents a depth from the sample surface, the depth being calculated from the time of sputtering and the average rate of etching previously determined based on the time required for sputter etching a deuterated polystyrene cover layer with a known thickness provided on the surface of the sample. In the plots of the fluorine concentrations at a depth 0 (surface) to 150 nm, a region with a high fluorine concentration is observed from the surface up to a depth of about 50 nm.

The same analysis was conducted on a polyimide film obtained by casting a solution on a glass plate to form a coating film and drying the film to remove the solvent, the solution being a random copolymer polyimide solution prepared by a usual polyimidation process using the same composition corresponding to all the raw is materials used in the multicomponent polyimide blend solution including the fluorine-containing polyimide. The results are plotted in FIG. 7. There is observed no noticeable gradient structure in the fluorine distribution near the surface.

When raw materials of the same composition as used to prepare a multicomponent polyimide containing a fluorine-containing polyimide are polymerized and imidated in a usual manner to prepare a random copolyimide solution, which is then formed into a polyimide film, the resulting film has a fluorine concentration ratio $\Phi_s/f$ of about 1.0.

In contrast, since the polyimide film of the invention has the fluorine-containing polyimide distributed in a higher ratio in the surface layer, the fluorine concentration ratio $\Phi_s/f$ (ratio of fluorine concentration $\Phi_s$ of at least one film surface to average fluorine concentration f of the whole film, measured by X-ray photoelectron spectroscopy) on at least one side of the film is 1.3 or higher, preferably 1.3 to 3, more preferably 1.4 to 2.6.

A polyimide film of the invention has a ratio of fluorine concentration ($\Phi_S$) of at least one surface of the film to fluorine concentration ($\Phi_{S'rand}$) of a surface of a film obtained by random copolymerization of all the raw materials, $\Phi_S/\Phi_{S'rand}$, of 1.1 to 2.6, preferably 1.2 to 2.4, as measured by X-ray photoelectron spectroscopy (XSP).

The polyimide film of the invention has controlled surface tension. Since the polyimide film of the invention contains a fluorine-containing polyimide in a higher proportion in its surface layer than a polyimide film in which all the raw materials of the polyimide are randomly bonded to each other, the surface properties of the polyimide film of the invention are more subject to influences from the fluorine-containing polyimide. One of such influences can be taken advantage of in controlling the surface tension of the film. Accordingly, the invention provides an embodiment of the polyimide film in which the polyamide A has no polar group or has a polar group which is not highly hydrophilic. In this embodiment, the polyimide film has a surface tension lower than that of a polyimide film having all the polyimide raw materials bonded at random, preferably by at least 10%. The invention also provides another embodiment in which the polyamide A has a polar group, particularly a highly hydrophilic polar group. In this case, the polyimide film has a surface tension higher than that of a polyimide film having all the polyimide raw materials bonded at random, preferably by at least 10%.

As alluded above, the polar group is preferably a highly hydrophilic polar group. Examples of particularly preferred hydrophilic polar groups include, but are not limited to, —COOH, —OH, —$SO_3H$, —$SO_3NH_4$, —$NHR_1$, and —$NR_2R_3$ (wherein $R_1$, $R_2$, and $R_3$ each represent an alkyl group or an aryl group) and, in addition, an alkyl group, an aryl group, and the like each having the recited polar group.

A polyimide film made of multicomponent polyimide comprising two polyimide components, i.e., a polyimide A containing a fluorine atom in its chemical structure and a polyimide B having no fluorine atom in its chemical structure has been described.

Seeing that the invention consists in improvement of the properties of a polyimide film by providing a molecular structure (chain structure) of a multicomponent polyimide with moderate blockness thereby to induce what we call microphase separation in the film, the polyimide film of the invention is not limited to the one made of a multicomponent polyimide containing a fluorine atom in a chemical structure of any polyimide component as long as the repeating unit of the polyimide A and that of the polyimide B are different and incompatible with each other.

The invention is also suitably applicable to a multicomponent polyimide containing a silicon atom in place of a fluorine atom.

Furthermore, the invention is suitably applicable to a multicomponent polyimide containing neither fluorine or silicone as long as the multicomponent polyimide comprises polyimides A and B different in repeating unit and therefore poorly compatible with each other or different from each other in mechanical properties characterized by, for example, elastic modulus or glass transition temperature.

Such combinations of polyimides A and B will then be described, which also hold good to the foregoing embodiment in which a polyimide A contains a fluorine atom in its chemical structure while a polyimide B contains no fluorine atom in its chemical structure.

The present invention is suitably applied to a combination of a polyimide A and a polyimide B with the absolute difference between solubility parameter $SP_A$ of the polyimide A and solubility parameter $SP_B$ of the polyimide B, $|SP_B - SP_A|$, being 0.5 $MPa^{1/2}$ or more, preferably 0.6 to 5 $MPa^{1/2}$; with the ratio of the elastic modulus $E_B$ of a film of the polyimide B to the elastic modulus $E_A$ of a film of the polyimide A, $E_B/E_A$, being 1.05 or higher, preferably 1.08 to 400; or with the absolute difference between glass transition temperature $Tg_A$ of the polyimide A and glass transition temperature $Tg_B$ of the polyimide B, $|Tg_B-Tg_A|$, being 20° C. or more, preferably 240 to 300° C.

Solubility parameter is one of measures of compatibility between polyimides. The smaller the difference in solubility parameter between polyimides A and B, the higher the compatibility between them, and vice versa. Solubility parameters of polyimides are obtained by, for example, the method by Fedors (see R. F. Fedors, *Polym. Eng. Sci.*, 14 (1974), 147) or the method by van Krevelen, et al. (see D. W. van Krevelen, P. J. Hoftyzer, *Properties of polymers, Their Estimation and Correlation with Chemical Structure*, 2nd ed., Elsevier, N.Y. (1990)).

In the invention, the absolute difference between solubility parameter $SP_A$ of the polyimide A and solubility parameter $SP_B$ of the polyimide B, $|SP_B-SP_A|$, is 0.5 MPa$^{1/2}$ or more, preferably 5 MPa$^{1/2}$ or less, more preferably 0.6 to 5 MPa$^{1/2}$. If $|SP_B-SP_A|$ is too small, microphase separation does not proceed between the polyimide components A and B. If $|SP_B-SP_A|$ is too large, it is difficult to inhibit macrophase separation between the polyimide components A and B.

In the invention, the ratio of the elastic modulus $E_B$ of a film of the polyimide B to the elastic modulus $E_A$ of a film of the polyimide A, $E_B/E_A$, is 1.05 or higher, preferably 400 or lower, more preferably 1.08 to 400. If the difference in mechanical properties is too small (i.e., if $E_B/E_A$ is extremely close to 1), improvement on mechanical properties of the film is not obtained. If the difference in mechanical properties is too large (i.e., if $E_B/E_A$ is very high), when the film is deformed, a stress will be concentrated in the interface between the phase of the polyimide component A and the phase of the polyimide component B, which can result in interface delamination.

Elastic modulus is temperature dependent. The elastic modulus ratio of concern, $E_B/E_A$, is preferably the one measured at the temperature of use of the film, usually room temperature.

In the invention, the absolute difference between glass transition temperature $Tg_A$ of the polyimide A and glass transition temperature $Tg_B$ of the polyimide B, $|Tg_B-Tg_A|$, is 20° C. or more, preferably 300° C. or less. It is preferred that the glass transition temperature $Tg_A$ of the polyimide A having a lower elastic modulus than the polyimide B be lower than the glass transition temperature $Tg_B$ of the polyimide B by at least 20° C., more preferably 24° to 200° C.

In the case when measurement of the glass transition temperature of a polyimide finds difficulty due to, for example, the influence of thermal decomposition, an estimated glass transition temperature obtained by estimation techniques, such as the group contribution method may be used instead. For example, the method by J. Bicerano in *Prediction of Polymer Properties*, 3rd ed., Marcel Dekker, Inc., New York, 2002 may be suited to estimate the glass transition temperature.

As previously stated, application of the process of making a polyimide film made of a multicomponent polyimide according to the present invention is not limited to the production of a polyimide film made of a fluorine-containing multicomponent polyimide.

The process of the invention is suitably applicable to a multicomponent polyimide containing a silicon atom instead of a fluorine atom.

The process of the invention is also suitably applicable to a multicomponent polyimide containing neither fluorine nor silicon as long as the multicomponent polyimide comprises polyimides A and B different in repeating unit and poorly compatible with each other or different in mechanical properties characterized by, for example, elastic modulus or glass transition temperature.

Such combinations of polyimides A and B to which the process of the invention is suitably applied include combinations of a polyimide A and a polyimide B with the absolute difference between solubility parameter $SP_A$ of the polyimide A and solubility parameter $SP_B$ of the polyimide B, $|SP_B-SP_A|$, being 0.5 MPa$^{1/2}$ or more, preferably 5 MPa$^{1/2}$ or less, more preferably 0.6 to 5 MPa$^{1/2}$; with the ratio of the elastic modulus $E_B$ of a film of the polyimide B to the elastic modulus $E_A$ of a film of the polyimide A, $E_B/E_A$, being 1.05 or higher, preferably 400 or lower, more preferably 1.08 to 400; or the absolute difference between glass transition temperature $Tg_A$ of the polyimide A and glass transition temperature $Tg_B$ of the polyimide B, $|Tg_B-Tg_A|$, being 20° C. or more, preferably 300° C. or less, more preferably 24° to 300° C.

That is, a polyimide film of the invention is suitably obtained by a process comprising the steps of:

(1) mixing a polyimide component A and a polyimide component B selected to satisfy relation below to prepare a multicomponent polyimide blend solution, $$2.35 \times N_A^{-2.09} < N_B < 450 \times N_A^{-1.12},$$

where $N_A$ is the number averaged polymerization degree of the polyimide component A; and $N_B$ is the number averaged polymerization degree of the polyimide component B;
the polyimide component A being raw materials of a polyimide A and/or a polyimidation product of the raw materials, the polyimide component B being raw materials of a polyimide B and/or a polyimidation product of the raw materials, and the polyimide A and B are any combinations described above, (2) subjecting the multicomponent polyimide blend solution to further polyimidation reaction, and (3) removing the solvent from a film of the multicomponent polyimide obtained in step (2).

The polyimide A contains a fluorine atom in its chemical structure. Preferably, the polyimide B does not contain a fluorine atom in its chemical structure. More preferably, the polyimide B has a tensile elongation at break of 4% or more, more preferably 10% or more, even more preferably 10 to 100%.

The proportion of the polyimide component A in the multicomponent polyimide is preferably 15% to 85% by weight, more preferably 20% to 80% by weight.

The polyimide A may contain a silicon atom in its chemical structure. Preferably the polyimide B does not contain a silicon atom in its chemical structure.

The polyimide A containing a silicon atom in its chemical structure is exemplified by, but is not limited to, a polyimide obtained by condensation and polyimidation between a silicon-containing diamine component and a tetracarboxylic acid component. Examples of the silicon-containing diamine component are α,ω-bis(2-aminoethyl)polydimethylsiloxane, α,ω-bis(3-aminopropyl)polydimethyl siloxane, α,ω-bis(4-aminophenyl)polydimethylsiloxane, α,ω-bis(4-amino-3-methyl phenyl)polydimethylsiloxane, α,ω-bis(3-aminopropyl)polydiphenylsiloxane, α,ω-bis(4-aminobutyl)polydimethylsiloxane, the compounds recited above with their ether group displaced with a phenylene group, 1,3-bis(2-aminoethyl) tetramethyldisiloxane, 1,3-bis(3-aminopropyl)tetramethyldisiloxane, 1,3-bis(4-amino phenyl)tetramethyldisiloxane, 1,3-bis(4-amino-3-methylphenyl)tetramethyldisiloxane, 1,3-bis(3-aminopropyl) tetraphenyldisiloxane, 1,3-bis(4-aminobutyl)tetramethyl disiloxane, 1,4-bis(2-aminoethyldimethylsilyl)benzene, 1,4-bis(3-aminopropyldimethyl silyl)benzene, 1,4-bis(4-aminophenyldimethylsilyl)benzene, 1,4-bis(4-amino-3-methylphenyldimethylsilyl)benzene, 1,4-bis(3-aminopropyldiphenylsilyl)benzene, and 1,4-bis(4-aminobutyldimethylsilyl)benzene. Examples of the tetracarboxylic acid component are pyromellitic acid, benzophenonetetracarboxylic acid, naphthalenetetracarboxylic acid, bis(dicarboxyphenyl)ether, bis(dicarboxyphenyl) sulfone, 2,2-bis(dicarboxyphenyl)propane, 2,3,3',4'-biphenyltetracarboxylic acid, 2,2',3,3'-biphenyltetracarboxylic acid, 3,3',4,4'-biphenyltetracarboxylic acid, and their anhydride and esters.

The polyimides A and B may contain neither a fluorine atom nor a silicon atom in their chemical structures. Polyimides A and B to be combined can be selected from conventional polyimides known in the art as long as the multicomponent polyimide comprises polyimides A and B different in repeating unit (inclusive of a tetracarboxylic acid component and a diamine component) and poorly compatible with each other or different in mechanical properties characterized by, for example, elastic modulus or glass transition temperature.

The polyimide A preferably has a glass transition temperature $Tg_A$ lower than the glass transition temperature $Tg_B$ of the polyimide B by at least 20° C., more preferably 24° to 300° C.

The polyimide film of the invention that can be preferably produced by, for example, the process of producing a polyimide film of multicomponent polyimide according to the present invention embraces embodiments that are characterized as follows.

A film of a multicomponent polyimide comprising polyimide components A and B which are combined such that the absolute difference between solubility parameter $SP_A$ of the polyimide A and solubility parameter $SP_B$ of the polyimide B, $|SP_B-SP_A|$, is 0.5 MPa$^{1/2}$ or more, preferably 0.6 to 5 MPa$^{1/2}$. The film is characterized by having, on at least one side thereof, a surface tension γ satisfying relation: $|γ-γ_{rand}|>0.3$ mN/m, preferably 0.4 mN/m$\leq|γ-γ_{rand}|\leq$10 mN/m, wherein $γ_{rand}$ is a surface tension of a film obtained by random polymerization of all the raw materials; and having no macrophase separation.

A polyimide film of a multicomponent polyimide comprising polyimide components A and B which are combined such that the ratio of elastic modulus $E_B$ of a film of the polyimide B to elastic modulus $E_A$ of a film of the polyimide A, $E_B/E_A$, is 1.05 or higher, preferably 1.08 to 400. The film is characterized by having an elastic modulus E satisfying relation: $E/E_{rand}>1.005$, preferably $1.01\leq E/E_{rand}\leq 1.5$, wherein $E_{rand}$ is an elastic modulus of a film obtained by random polymerization of all the raw materials, and having no macrophase separation.

A polyimide film of a multicomponent polyimide comprising polyimide components A and B which are combined such that the absolute difference between glass transition temperature $Tg_A$ of the polyimide A and glass transition temperature $Tg_B$ of the polyimide B, $|Tg_B-Tg_A|$, is 20° C. or more, preferably 24° to 300° C. The film is characterized by having an elastic modulus E satisfying relation: $E/E_{rand}>1.005$, preferably $1.01\leq E/E_{rand}\leq 1.5$, wherein $E_{rand}$ is an elastic modulus of a film obtained by random polymerization of all the raw materials, and having no macrophase separation.

A polyimide film of a multicomponent polyimide containing a fluorine atom. The film has a ratio of fluorine concentration $\Phi_S$ of at least one surface thereof to average fluorine concentration f of the whole film, $\Phi_S/f$, of 1.3 to 3, preferably 1.4 to 2.6, as measured by X-ray photoelectron spectroscopy (XSP).

A polyimide film of a multicomponent polyimide containing a fluorine atom. The film has a ratio of fluorine concentration $\Phi_S$ of at least one surface thereof to fluorine concentration $\Phi_{S'rand}$ of a surface of a film obtained by random copolymerization of all the raw materials, $\Phi_S/\Phi_{S'rand}$, of 1.1 to 2.6, preferably 1.2 to 2.4, as measured by X-ray photoelectron spectroscopy (XPS).

A polyimide film of a multicomponent polyimide containing a silicon atom. The film has a ratio of silicon concentration $\Phi_s$ of at least one surface thereof to silicon concentration $\Phi_{S'rand}$ of a surface of a film obtained by random copolymerization of all the raw materials, $\Phi_S/\Phi_{S'rand}$, of 1.1 to 4, preferably 1.2 to 3.4, as measured by X-ray photoelectron spectroscopy (XPS).

As described, the polyimide film according to the invention has not only modified surface properties but also modified mechanical properties. The inventors believe that the modification of such properties is the results of control, on the surface and in the inside of the film, of the spatial distribution and the state of condensation of the polyimide components. When the fractured surface morphology of a polyimide film is observed, and an FE-SEM microphotograph is taken, an average of diameters of microfine particles revealed or the breadths (a length in the direction perpendicular to the longitudinal direction) of microfine nodules revealed is taken as a size λ characterizing the state of condensed structure of the film. The polyimide film of the invention preferably has λ of 50 nm or smaller.

In the present invention, the solubility parameter of polyimide and the surface tension of a film were determined by the following methods.

Determination of Solubility Parameter of Polyimide:

The Synthia module of Accelrys Materials Studio (ver. 4.0) from Accelrys, Inc. was used to calculate solubility parameter for the chemical structure of polyimide components in accordance with the Fedors' method. For prediction of solubility parameter of a random copolyimide, the solubility parameter of each homopolyimide component i constructing the random copolyimide was calculated by the Fedors' method. The solubility parameter of component i is multiplied by the volume fraction ψi of component i and averaged.

Measurement of Film Surface Tension:

The critical surface tension of a film was determined as follows. A series of test fluids each having a different known surface tension was used. A contact angle (θ) of each test fluid on a sample film was measured at 23° C. Cosines of contact angles of the series of test fluids are plotted against the surface tensions of the test liquids to establish a Zisman plot. The critical surface tension of the film surface is defined as the value on the surface tension axis that corresponds to cosine θ=1 by extrapolation.

As used herein, the term "random copolymer" denotes a multicomponent polyimide obtained by subjecting a mixture of all the raw materials of the polyimides A and B (all the unreacted tetracarboxylic acid components and diamine components) to polyimidation reaction (random copolymerization) at a time.

In the case where a polyimide film contains a third component other than the polyimides A and B, the surface tension $γ_{rand}$ of a film of a corresponding random copolymer is the surface tension of a film of a random copolymer obtained from the raw materials containing the same amount of the third component.

An elastic modulus of the polyimide film is measured as follows.

Measurement of Elastic Modulus of Polyimide Film:

A sample film having been conditioned at 23° C. and 50% RH was elongated at a strain rate of 50%/min to read the initial elastic modulus, which was taken as an elastic modulus of the film.

In the case where a polyimide film contains a third component other than the polyimides A and B, the elastic modulus $E_{rand}$ of a film of a corresponding random copolymer is the elastic modulus of a film of a random copolymer obtained from the raw materials containing the same amount of the third component.

The ratio of the polyimide components A and B in the polyimide film of the invention is preferably such that a weight fraction $w_A$ of the polyimide component A in the sum of the weight $W_A$ of the polyimide component A and the weight $W_B$ of the polyimide component B in the polyimide film, $w_A = W_A/(W_A+W_B) \times 100(\%)$, is 15% to 85%, more preferably 20% to 80%. In a lower ratio of the polyimide component A, the resulting film cannot enjoy sufficient effects of the polyimide component A in improving the physical properties. In a higher ratio of the polyimide component A, the film cannot obtain sufficient effects of the polyimide component B in improving the physical properties.

The polyimide film of the invention may be a very thin film with a thickness of less than 10 μm and not less than 10 nm.

EXAMPLES

Methods of measurement and determination used in the invention are described below.

(1) Degree of Polymerization

A correlation between number averaged degree of polymerization and solution viscosity is previously determined by measuring an imidation ratio through, for example, gel-permeation chromatography (GPC) or infrared spectroscopy. A number averaged degree of polymerization of a sample can thus be obtained by measuring the solution viscosity of a reaction solution. GPC measurement was adopted for reaction solutions having an imidation ratio of 90% or higher, and infrared spectroscopy for those having an imidation ratio less than 90%.

GPC measurement was carried out by using an HPLC system of 800-series available from JASCO Corp. equipped with a Shodex KD-806M column (column temperature: 40° C.) and Intelligent UVN is detector (absorption wavelength: 350 nm) for unknown samples or a differential refractive index detector for standards (polyethylene glycol). N-Methyl-2-pyrrolidone containing 0.05 mol/l each of lithium chloride and phosphoric acid was used as a solvent. The flow rate of the solvent was 0.5 ml/min, and the sample concentration was about 0.1%. Data acquisition and processing were done by JASCO-JMBS/BORWIN software. Data was acquired twice a second to prepare a chromatogram of a sample. Polyethylene glycols having a molecular weight of 82250, 28700, 6450, and 1900 were used as standards to provide chromatograms, from which peaks were detected to prepare a calibration curve showing the relation between retention time and molecular weight. The molecular weight analysis of an unknown sample was performed as follows. Molecular weight Mi at each retention time was obtained from the calibration curve, and the fraction Wi of the height hi of the chromatogram at each retention time to the total height (Wi=hi/Σhi) was obtained. The number averaged molecular weight Mn and weight averaged molecular weight Mw of the sample were calculated from 1/[Σ(Wi/Mi)] and Σ(Wi·Mi), respectively.

The number averaged degree of polymerization N was obtained by dividing the number averaged molecular weight Mn by a monomer unit molecular weight <m> averaged according to the proportion of the monomer components used to commence polymerization.

$$N = Mn/<m> \quad (3)$$

The monomer unit molecular weight <m> was obtained as follows. When a plurality of tetracarboxylic acid components (molecular weight: m1,i; molar ratio: R1,i; ΣR1, i=1; i=1, 2, 3, ..., n1) and a plurality of diamine components ((molecular weight: m2,j; molar ratio: R2,j; ΣR2, j=1; j=1, 2, 3, ..., n2) are charged, the monomer unit molecular weight <m> was calculated according to equation:

$$<m> = (\Sigma R1, im1, i + \Sigma R2jm2j) - 36 \quad (4)$$

In GPC of some polyimide components having poor solubility in N-methyl-2-pyrrolidone, hexafluoroisopropyl alcohol containing 0.01 mol/l of $CF_3COONa$ was used instead as a solvent. In this case, GPC measurement was carried out by using two columns, Shodex HFIP-LG and Shodex HFIP-806M, (column temperature: 40° C.) and RI-8011 as a detector for unknown samples or a differential refractive index detector for the standards. The flow rate of the solvent was 0.8 mL/min, and the sample concentration was about 0.1%. Polymethyl methacrylates having a molecular weight of 1,400,000, 820,000, 480,000, 260,000, 127,000, 67,000, 34,500, 15,100, 6,400, 2,400, and 960 were used as standards to provide chromatograms, from which peaks were detected to prepare a calibration curve showing the relation between retention time and molecular weight. The molecular weight analysis of an unknown sample was performed in the same manner as with the case of using the N-methyl-2-pyrrolidone solvent. That is, molecular weight Mi at each is retention time was obtained from the calibration curve, and the fraction Wi of the height hi of the chromatogram at each retention time to the total height (Wi=hi/Σhi) was obtained. The number averaged molecular weight Mn and weight averaged molecular weight Mw of the sample were calculated from 1/[Σ(Wi/Mi)] and Σ(Wi·Mi), respectively.

(2) Determination of Polymerization Degree from Imidation Ratio

Imidation ratio measurement by infrared spectroscopy was performed by attenuated total reflection-Fourier transform infrared spectrometry (ATR-FTIR) on Spectrum-One FTIR spectrophotometer (Perkin Elmer). The absorbance A of C—N stretching vibration (wave number: about 1360 $cm^{-1}$) of an imide bond was standardized taking the absorbance AI of aromatic ring C=C in-plane vibration (wave number: about 1500 $cm^{-1}$) as an internal standard. The same sample was analyzed in the same manner after heat treatment at 190° C. for 5 hours, and the absorbance As of C—N stretching vibration was standardized using the absorbance $A_S I$ of aromatic ring C=C in-plane vibration as an internal standard. The imidation ratio pI is calculated by dividing the former standardized value (A/AI) by the latter standardized value $(A_S/A_S I)$.

$$pI = (A/AI)/(A_S/A_S I) \quad (5)$$

The line connecting valleys on both sides of an absorption band was taken as a base line from which the peak intensity of absorbance was measured.

The number averaged degree of polymerization N was calculated from the imidation ratio according to equation:

$$N=(1+r)/(2r(1-pI)+(1-r)) \tag{6}$$

where r is a compositional ratio of the total number of moles of a diamine component(s) to the total number of moles of a tetracarboxylic acid component(s) in a polyimide, provided that, when a diamine component is more than a tetracarboxylic acid component, the reciprocal of the ratio is used as r (in either case, r is not greater than one); and pI is an imidation ratio.

(3) Determination of Fluorine Concentration in Surface of Dense Layer by XPS

In the present invention, the proportion of a fluorine-containing polyimide in the dense layer can be found by determining the fluorine atom concentration $\Phi_S$ in the dense layer's surface by X-ray photoelectron spectroscopy (XPS or ESCA).

An atomic concentration $\Phi_j$ of a specific element j is represented by the following equation, in which $N_i$ is the number of atoms of a detectable element contained in a polyimide (hydrogen and helium are undetectable); and $N_j$ is the number of atoms of the specific element j (the subscript represents an element species).

$$\Phi_j = N_j/\Sigma N_i \tag{7}$$

where $\Sigma N_i$ is the sum of the numbers of atoms of all the detectable elements in the polyimide.

XPS is carried out by bombarding the surface of a polyimide film with X-rays to extract electrons (called photoelectrons) from each orbital of each element contained in the polyimide into the vacuum, and measuring the intensity (photoelectrons spectrum) of the emitted photoelectrons versus the kinetic energy. In order to minimize damage to the polyimide surface, it is advisable to use monochromatized AlKα rays free from X-ray components unnecessary for XPS.

Binding energy $E_b$ of electrons in atoms in a substance is calculated from the photoelectron kinetic energy $E_k$ according to equation:

$$E_b = hv - E_k - W \tag{8}$$

where hv is an incident energy of X-rays; and W is a work function of a spectrometer used to detect photoelectrons.

Since the binding energy depends almost entirely on the atom species and the electron orbital, detection of all elements should be possible theoretically only if the incident energy of X-rays is correctly chosen. In fact, however, hydrogen and helium cannot be detected because of the small probability of the electron on each orbital being excited by X-rays (photoionization cross section).

The intensity $I_j$ of the photoelectron emitted by X-ray bombardment from orbital 1 of specific element j present in polyimide is represented by equation:

$$Ij = Nj\sigma j^1 \lambda j^1 Aj^1 R \tag{9}$$

where Nj is the number of atoms of element j per unit volume; $\sigma j^1$ is the area of the 1-shell photoionization cross section of element j; $\lambda j^1$ is the mean-free-path for inelastic scattering of an electron emitted from 1-shell of element j traveling in polyimide; $Aj^1$ is a function of an instrument on the electron emitted from 1-shell of element j; and R is the surface roughness coefficient of a polyimide film.

The area of the photoionization cross section $\sigma j^1$ and the mean-free-path for inelastic scattering $\lambda j^1$ are known values. $Aj^1$ is a value decided from the instrument and measurement conditions. The value R varies from sample to sample but is cancelled by taking an intensity ratio and is therefore unnecessary in the calculations hereinafter described to obtain an atomic concentration.

In the present invention, the atomic concentration $\Phi_j$ of specific element j in polyimide was obtained using the measured photoelectron intensity Ij in accordance with equation:

$$\Phi_j = (Ij/Sj)/\Sigma(Ii/Si) \tag{10}$$

where $Sj = \sigma j^1 \lambda j^1 Aj^1$; Sj represents relative sensitivity for element i; and $\Sigma(Ii/Si)$ represents the sum of photoelectron intensities of all the detectable elements i present in polyimide divided by the respective relative sensitivities.

The relative sensitivity Sj can be decided separately using a standard substance whose atomic concentration is known. While relative sensitivity S'j that is furnished by an XPS system manufacturer may be utilized for the sake of convenience, a relative sensitivity was decided in the present invention by using a polyimide having a single composition (i.e., a homopolyimide obtained from one tetracarboxylic acid component and one diamine component) the atomic concentration of which is known.

When a sample made of a polyimide having a single composition (i.e., a homopolyimide obtained from one tetracarboxylic acid component and one diamine component) is analyzed, it is expected that the surface atomic concentration $\Phi_{s,j}$ and the average atomic concentration fj are in substantial agreement. If a relative sensitivity S'j supplied by an XPS system manufacturer, etc., i.e., a relative sensitivity factor corrected by the instrumental function, is used as such in the measurement of surface atomic concentration $\Phi_{s,j}$, there is often disagreement between $\Phi_{s,j}$ and fj. The disagreement is attributed to the fact that the relative sensitivity S'j is a value experimentally obtained using a standard substance other than polyimide. Therefore, the value S'j was corrected so that the surface atomic concentration $\Phi_{s,j}$ and the average atomic concentration fj of a sample made of a homopolyimide having a single composition may agree with each other, and the thus corrected value was used as relative sensitivity Sj in the determination of a surface atomic concentration of a polyimide material. Namely, the relative sensitivity Sj as used in the invention is represented by equation:

$$Sj = S'j \times \alpha j \tag{11}$$

where αj is a correction factor for making a relative sensitivity S'j determined for element j by using other standard material than polyimide applicable to a polyimide material.

In the present invention, the correction factor was obtained for every element through measurements, and a relative sensitivity Sj as corrected by the correction factor was used.

In the invention, the photoelectron intensity Ij was obtained from the photoelectron peak area in the photoelectron spectrum measured by XPS. Of photoelectron peaks a peak for a transition with a relatively large photoionization cross section is preferably made use of. Usually, a photoelectron peak for a transition having a photoionization cross section 10% larger than that of the C 1s orbital is conveniently used. In the invention, a photoelectron peak from the 1s orbital is preferably made use of for fluorine. A photoelectron peak from the 1s orbital was used for carbon; the 1s orbital for nitrogen; the 1s orbital for oxygen; and the 2p orbital for sulfur.

The photoelectron spectrum has a background due to inelastic scattering of photoelectrons when emitted from a sample into the vacuum. The background is subtracted from each photoelectron peak used to determine an atomic concentration, and the residual area is taken as Ij.

When the asymmetric polyimide film to be XPS analyzed is a hollow fiber, an X-ray spot size should be less than the hollow fiber diameter. The hollow fiber diameter being 30 μm or larger, generally about 100 μm or larger, a spot size of about 100 μm or smaller is suitably used. A spot size of about 20 μm is preferably used.

Because the polyimide surface is electrically charged as photoelectrons are ejected, it is preferred to neutralize the surface charges by, for example, an electron beam.

In XPS measurement, the depth of measurement from the specimen surface varies depending on the photoelectron emission take-off angle θ measured relative to the specimen surface. Ninety-five percent of the photoelectrons detected by XPS are those emitted from a depth up to $3\lambda j^1 \sin\theta$. The range of θ is not particularly limited as long as measurement is possible. For example, an angle of 45° is conveniently used. The depth of analysis is up to several nanometers from the specimen surface. Therefore, the atomic concentration as measured by XPS is surface atomic concentration $\Phi_s,j$ within a thickness ranging from the surface to a depth of several nanometers.

On the other hand, the average atomic concentration fj for element j contained in multicomponent polyimide forming the whole membrane is represented by equation:

$$fj = \Sigma mknk / \Sigma mkNk \quad (12)$$

where nk is the number of atoms of element j contained in monomer k (when monomer k is a tetracarboxylic acid or an anhydride thereof, and element j is oxygen, nk is the number of oxygen atoms except the oxygen atoms released in the form of condensation water at the time of polymerization into polyimide); Nk is the total number of all the XPS-detectable atoms in monomer k (when monomer k is a tetracarboxylic acid or an anhydride thereof, Nk is the number of all the detectable atoms except the oxygen atoms released in the form of condensation water on polymerization to polyimide); mk is the molar fraction of monomer k in multicomponent polyimide forming the film; and Σ means summation of data for all the monomers k in the multicomponent polyimide.

The average fluorine atom concentration f of a whole film in the present invention is a value calculated according to the above-described equation.

(4) Determination of Surface Tension

A series of test fluids each having a different known surface tension were used. A contact angle (θ) of each test fluid on a sample film was measured, and cosines of contact angles θ were plotted against the surface tensions of the test liquids to create a Zisman plot. The surface tension value for cos θ=1 (critical surface tension) obtained by extrapolation of the plot is the surface tension of the polyimide film.

More specifically, contact angle measurements were carried out on a Kruss prop Shape Analysis System DSA20. The measuring temperature was 23° C. A drop of each of a series of test fluids having different surface tensions (from Wako Pure Chemical Industries, Ltd.) was placed on the side of a sample film that had been exposed to air in the film formation, and the contact angle of the drop was measured. The complete profile of the drop was fitted by the tangent method to a general conic section equation. The differential of the equation at the baseline gives the slope at the three-phase contact point and thus the contact angle. A drop of 5 μl of a test fluid was automatically placed on the sample, and the contact angle of the drop was measured after 30 seconds. The same measurement was repeated using the same test fluid with the amount of the drop increasing by 5 μl until 30 μl. The contact angle of a drop of 0 μl was obtained from the relation between contact angle versus amount of drop of the test fluid, which was taken as the contact angle (θ) of the test fluid on the sample film. The contact angles of the other test fluids of different surface tension were determined to form a Zisman plot in which the relationship between the surface tension of the fluids and the contact angles is plotted, from which the surface tension (critical surface tension) of the sample film was obtained.

The difference δ in surface tension between the polyimide film of the invention and a polyimide film obtained by random copolymerization of all the raw materials is represented by equation: $\delta = \gamma - \gamma_{rand}$, where $\gamma_{rand}$ is the surface tension of the latter film.

(5) Determination of Glass Transition Temperature

A loss tangent (tan δ) temperature dependence curve was obtained for a film of each polyimide component using Rheometric Solid Analyzer RSA-III (from Rheometric Scientific, Inc.). The temperature of the peak of tan δ was taken as a glass transition temperature (Tg). The tan δ curve was obtained by maintaining a sample film at 120° C. for 10 minutes and then measuring storage modulus E' and loss elastic modulus E" of the film for every 3 degrees between −150° to 450° C. in a nitrogen stream at a measuring frequency of 10 Hz.

For some homopolyimides that showed no clear peak in their tan δ curves, a calculated glass transition temperature ($Tg_{calc}$) obtained by using the Synthia module of Accelrys Materials Studio (ver. 4.0) from Accelrys, Inc in accordance with the Bicerano's method was used as a reference value. In calculating $Tg_{calc}$ of a random copolyimide component, calculation was performed using $Tg_{calc},i$ for each homopolyimide component i constructing the random copolyimide obtained by the Bicerano's method and weight fraction wi of each homopolyimide component i in accordance with the following Fox equation:

$$Tg_{calc} \text{ of random copolyimide} = 1/[\Sigma(wi/Tg^{calc},i)] \quad (13)$$

(6) Measurement of Rotational Viscosity

The rotational viscosity of a polyimide solution was measured with a rotational viscometer (shear rate: 1.75 sec$^{-1}$) at 100° C.

(7) Preparation of Polyimide Film

A polyimide solution was prepared with its solution viscosity adjusted to 50 to 1000 poise at 100° C., filtered through a 400 mesh metal screen, and left still at 100° C. for defoaming. The polyimide solution thus prepared was cast at 50° C. on a glass plate with a doctor knife having an opening of 0.5 mm or 0.2 mm, heated in an oven at 100° C. for 3 hours to remove the solvent, and further heated in the oven at 300° C. for 1 hour to give a polyimide film.

(8) Measurement of Mechanical Properties of Film

A strip specimen of about 2 mm in width was cut out of a polyimide film. The strip specimen was bound to a paper frame with an epoxy adhesive to prepare a test sample, which was subjected to tensile elongation test. The cross-sectional area of the specimen was calculated from the thickness measured with a digital dial gauge and the width measured on an optical micrograph. The specimen was elongated in an atmosphere of 23° C. and 50% RH with an effective length of 20 mm at an elongation speed of 10 mm/min to measure initial elastic modulus (or simply "elastic modulus"), tensile strength, and elongation at break.

(9) Cloudiness of Film

Cloudiness of film may be evaluated with the naked eye. In the invention, however, cloudiness of film was evaluated in terms of haze. Total light transmission Tt and defused light transmission Td of each film were measured using a UV/Vis/NIR spectrophotometer V-570 (JASCO Corp.) equipped with an integrating sphere ISN-470 (JASCO Corp.) to obtain a haze value Th (Th=Td/Tt×100 (%)). A film having a haze value greater than 50% was judged to be cloudy. For example, the films of Example 3 and Comparative Example 3 hereinafter given had a haze less than 4%, whereas those of Comparative Examples 4 and 5 had a haze of 61% and 87%, respectively. The films of Examples 3 and Comparative Example 3 were judged to be not cloudy, whilst those of Comparative Examples 4 and 5 cloudy.

(10) Measurement of Nodule Size on Freeze-Fractured Surface

A film was frozen in liquid nitrogen and snapped to run a previously made cut to expose a freeze-fractured cross-section. The fractured cross-section was coated with a very thin electroconductive film and observed under a field emission scanning electron microscope (FE-SEM). Fracture of a film runs through relatively fragile portions of a structure consisting of spatial arrangement of a great number of molecular chains of the multicomponent polyimide in the film (hereinafter also designated "higher order structure"). Therefore, a fractured surface presents the three-dimensional profile (hereinafter referred to as "fractured surface morphology") reflecting the characteristics of the higher order structure. The fractured surface morphology revealed a higher order structure appearing as an agglomerate of microfine particles or branches (hereinafter inclusively referred to as nodules) of about 1 to 100 nm in size. The higher order structure, being formed by spatial arrangement of polyimide molecular chains, varies according to whether the molecular structure (chain structure) of a multicomponent polyimide has blockness or randomness, whether or not the film has what we call microphase separation, as well as whether the film has macrophase separation. The diameters of microfine particles or the breadths (a length in the direction perpendicular to the longitudinal direction) of microfine branches revealed by the fractured surface morphology are measured on an FE-SEM image of the fractured surface. The average of the measurements is taken as a size $\lambda$ characterizing the state of condensed structure of the film.

Example 1

A homopolyimide (6FDA-TSN) obtained from 2,2-bis(3,4-dicarboxyphenyl)hexafluoropropane dianhydride (6FDA) and dimethyl-3,7-diaminodibenzothiaphene 5,5-dioxide (TSN) was chosen as a polyimide A. A polyimide (s-BPDA-TSN) obtained from 3,3',4,4'-biphenyltetracarboxylic acid dianhydride (s-BPDA) and TSN was chosen as a polyimide B.

The solubility parameters $SP_A$ and $SP_B$ of the polyimides A and B were 24.33 MPa$^{1/2}$ and 25.38 MPa$^{1/2}$, respectively, giving $|SP_B-SP_A|$ of 1.05 MPa$^{1/2}$.

The elastic modulus $E_A$ and the glass transition temperature $Tg_A$ (reference value) of the polyimide A were 3.80 GPa and 371° C., respectively. The elastic modulus $E_B$ and the glass transition temperature $Tg_B$ of the polyimide B were 5.07 GPa and higher than 400° C., respectively. Accordingly, $E_B/E_A=1.33$, and $|Tg_B-Tg_A|>29°$ C.

In a separable flask were put 12.36 g of s-BPDA, 11.38 g of TSN (0.988 mol of diamine per mole of acid dianhydride, B/A=0.988), and 171 g of p-chlorophenol (PCP) as a solvent, and the system was allowed to polyimidate at 190° C. for 30 hours to obtain a polyimide B solution having a polymer concentration of 11.5 wt %. The polyimide B was found to have a number averaged degree of polymerization $N_B$ of 75 as measured by the above-described GPC method. To the polyimide solution were added 12.44 g of 6FDA, 8.30 g of TSN (1.081 mol of diamine per mole of acid dianhydride), and 20 g of PCP as a solvent. The resulting multicomponent polyimide blend solution was subjected to further polyimidation at 190° C. for 8 hours to obtain a multicomponent polyimide blend solution having a rotational viscosity of 2306 poise and a polymer concentration of 18 wt %. The number averaged degree of polymerization of the resulting multicomponent polyimide was found to be 40 as measured by the above-described GPC method.

The resulting multicomponent polyimide blend solution was formed into film using a 0.5 mm doctor knife in accordance with the above described process of preparing a polyimide film. The resulting film had a thickness of 25 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copolyimide (Comparative Example 1). As a result, the difference in surface tension $|\gamma-\gamma_{rand}|$ was 5.0 mN/m, the ratio of elastic modulus, $E/E_{rand}$ was 1.019, and the ratio of surface fluorine concentration, $\Phi_s/\Phi_{s,rand}$ was 2.2.

A freeze-fracture surface of the resulting polyimide film was observed under an FE-SEM to obtain the nodule size (FIG. 8).

Comparative Example 1

In a separable flask, 12.36 g of s-BPDA, 12.44 g of 6FDA, and 19.68 g of TSN were polyimidated in 191 g of PCP as a solvent at 190° C. for 16 hours to obtain a polyimide solution having a rotational viscosity of 2195 poise and a polymer concentration of 18 wt %. The polyimide was found to have a number averaged degree of polymerization of 44 as measured by the above described GPC method.

The resulting multicomponent polyimide blend solution was formed into film using a 0.5 mm doctor knife in accordance with the above described process of preparing polyimide film. The resulting film had a thickness of 25 μm. The characteristics of the film were measured. The results obtained are shown in Table below.

The composition of the raw materials used in Comparative Example 1 is nearly the same as that of Example 1, but the resulting film had $\Phi_s/f$ of 1.05, which was small. Furthermore, the elastic modulus and tensile strength of the film were lower than those of the film of Example 1.

A freeze-fracture surface of the resulting polyimide film was observed under an FE-SEM to obtain the nodule size (FIG. 9).

Example 2

A homopolyimide (6FDA-DABA) obtained from 6FDA and 3,5-diaminobenzoic acid (DABA) and a polyimide (s-BPDA-TSN) obtained from s-BPDA and TSN were chosen as polyimide A and B, respectively.

$SP_A$ was 24.31 MPa$^{1/2}$, and $SP_B$ was 25.38 MPa$^{1/2}$, giving $|SP_B-SP_A|$ of 1.07 MPa$^{1/2}$.

$E_A$ was 3.87 GPa. $Tg_A$ (reference value) was 275° C. $E_B$ was 5.07 GPa. $Tg_B$ was higher than 400° C. Accordingly, $E_B/E_A=1.31$, and $|Tg_B-Tg_A|>125°$ C.

In a separable flask were put 12.36 g of s-BPDA, 11.38 g of TSN, and 154 g of PCP as a solvent, and the system was allowed to polyimidate at 190° C. for 30 hours to obtain a polyimide B solution having a polymer concentration of 12.6 wt %. The polyimide B was found to have a number averaged degree of polymerization $N_B$ of 75 as measured by the above-described GPC method. To the polyimide solution were added 12.44 g of 6FDA, 4.61 g of DABA, and 20 g of PCP as a solvent. The resulting multicomponent polyimide blend solution was subjected to further polyimidation at 190° C. for 5 hours to obtain a multicomponent polyimide blend solution having a rotational viscosity of 2120 poise and a polymer concentration of 18 wt %. The number averaged degree of polymerization of the multicomponent polyimide was found to be 78 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copolyimide (Comparative Example 2). As a result, $|\gamma-\gamma_{rand}|$ was 4.6 mN/m, $E/E_{rand}$ was 1.136, and $\Phi_s/\Phi_{s,rand}$ was 2.3.

Comparative Example 2

In a separable flask, 12.36 g of s-BPDA, 12.44 g of 6FDA, 11.81 g of TSN, and 4.37 g of DABA were polyimidated in 175 g of PCP as a solvent at 190° C. for 26 hours to obtain a polyimide solution having a rotational viscosity of 1655 poise and a polymer concentration of 18 wt %. The polyimide was found to have a number averaged degree of polymerization of 44 as measured by the above described GPC method.

The resulting multicomponent polyimide blend solution was formed into film using a 0.5 mm doctor knife in accordance with the above described process of producing a polyimide film. The resulting film had a thickness of 29 μm. The characteristics of the film were measured. The results obtained are shown in Table below.

The composition of the raw materials used in Comparative Example 2 was nearly the same as that of Example 2, but the resulting film had $\Phi_s/f$ of 1.04, which was small. Furthermore, the elastic modulus, tensile strength and elongation at break of the film were lower than those of the film of Example 2.

Example 3

A random copolyimide (6FDA-TSN-DABA) obtained from 6FDA, TSN, and DABA (TSN/DABA molar ratio=85/15)) and a polyimide (s-BPDA-TSN) obtained from s-BPDA and TSN were chosen as polyimides A and B, respectively.

$SP_A$ was 24.33 MPa$^{1/2}$, and $SP_B$ was 25.38 MPa$^{1/2}$, giving $|SP_B-SP_A|$ of 1.05 MPa$^{1/2}$.

$E_A$ was 3.82 GPa. $Tg_A$ (reference value) was 335° C. $E_B$ was 5.07 GPa. $Tg_B$ was higher than 400° C. Accordingly, $E_B/E_A$=1.33, and $|Tg_B-Tg_A|$>65° C.

In a separable flask were put 12.36 g of s-BPDA, 11.35 g of TSN, and 165 g of PCP as a solvent, and the system was allowed to polyimidate at 190° C. for 35 hours to obtain a polyimide B solution having a polymer concentration of 11.9 wt %. The polyimide B was found to have a number averaged degree of polymerization $N_B$ of 77 as measured by the above-described GPC method. To the polyimide solution were added 12.44 g of 6FDA, 5.21 g of TSN, and 1.73 g of DABA, and 20 g of PCP as a solvent. The resulting multicomponent polyimide blend solution was subjected to further polyimidation at 190° C. for 8 hours to obtain a multicomponent polyimide blend solution having a rotational viscosity of 1618 poise and a polymer concentration of 18 wt %. The number averaged degree of polymerization of the multicomponent polyimide was found to be 41 as measured by the above-described GPC method.

The resulting multicomponent polyimide blend solution was formed into film using a 0.5 mm doctor knife in accordance with the above described process of producing a polyimide film. The resulting film had a thickness of 26 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copolyimide (Comparative Example 3). As a result, $|\gamma-\gamma_{rand}|$ was 6.8 mN/m, $E/E_{rand}$ was 1.038, and $\Phi_s/\Phi_{s,rand}$ was 2.0.

Comparative Example 3

In a separable flask, 12.36 g of s-BPDA, 12.44 g of 6FDA, 16.73 g of TSN, and 1.64 g of DABA were polyimidated in 185 g of PCP as a solvent at 190° C. for 13 hours to obtain a polyimide solution having a rotational viscosity of 2623 poise and a polymer concentration of 18 wt %. The polyimide was found to have a number averaged degree of polymerization of 37 as measured by the above described GPC method.

The resulting multicomponent polyimide blend solution was formed into film using a 0.5 mm doctor knife in accordance with the above described process of producing a polyimide film. The resulting film had a thickness of 28 μm. The characteristics of the film were measured. The results obtained are shown in Table below.

The composition of the raw materials used in Comparative Example 3 was nearly the same as that of Example 3, but the resulting film had $\Phi_s/f$ of 1.23, which was small. Furthermore, the film was inferior to the film of Example 3 in elastic modulus, tensile strength, and elongation at break.

Comparative Example 4

A homopolyimide (6FDA-TSN-DABA) obtained from 6FDA, TSN, and DABA (TSN/DABA molar ratio=5/3) and a polyimide (s-BPDA-TSN-DADE) obtained from s-BPDA, TSN, and 4,4-diaminodiphenyl ether (DADE) (TSN/DADE molar ratio=9/1) were chosen as polyimide A and B, respectively. The amount of DADE being so small, the combination of the raw materials can be said to be almost equal to that of Example 3.

In a separable flask, 27.32 g of 6FDA, 10.29 g of TSN, and 3.42 g of DABA were polyimidated in 162 g of PCP as a solvent at 190° C. for 110 hours to obtain a polyimide A solution having a polymer concentration of 19.3 wt %. The polyimide A was found to have a number averaged degree of polymerization $N_A$ of 30 as measured by the above described GPC method.

In a separable flask, 52.66 g of s-BPDA, 46.00 g of TSN, and 3.73 g of DADE were polyimidated in 419 g of PCP as a solvent at 190° C. for 25 hours to obtain a polyimide B solution having a polymer concentration of 18.7 wt %. The polyimide B was found to have a number averaged degree of polymerization $N_B$ of 63 as measured by the above described GPC method.

In a separable flask, 92 g of the polyimide A solution and 100 g of the polyimide B solution were mixed. The resulting multicomponent polyimide blend solution was subjected to further polyimidation reaction at 190° C. for 3 hours to obtain a multicomponent polyimide blend solution having a rotational viscosity of 1618 poise and a polymer concentration of 18.8 wt %. The number averaged degree of polymerization of the multicomponent polyimide was found to be 76 as a result of the above described GPC method. The $N_A/N_B$ combination was out of the range according to the invention.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below. The elastic modulus and tensile strength of the film were lower than those of the film of Example 3. The film showed macrophase separation and was cloudy.

Comparative Example 5

The same chemical structures as used in Comparative Example 4 were chosen as polyimides A and B.

In a separable flask, 26.65 g of 6FDA, 10.49 g of TSN, and 3.49 g of DABA were polyimidated in 161 g of PCP as a solvent at 190° C. for 40 hours to obtain a polyimide A solution having a polymer concentration of 19.3 wt %. The polyimide A was found to have a number averaged degree of polymerization $N_A$ of 44 as measured by the above described GPC method.

In a separable flask, 52.66 g of s-BPDA, 46.00 g of TSN, and 3.73 g of DADE were polyimidated in 419 g of PCP as a solvent at 190° C. for 25 hours to obtain a polyimide B solution having a polymer concentration of 18.7 wt %. The polyimide B was found to have a number averaged degree of polymerization $N_B$ of 66 as measured by the above described GPC method.

In a separable flask, 90 g of the polyimide A solution and 100 g of the polyimide B solution were mixed. The resulting multicomponent polyimide blend solution was subjected to further polyimidation reaction at 130° C. for 3 hours to obtain a multicomponent polyimide blend solution having a rotational viscosity of 2753 poise and a polymer concentration of 19 wt %. The number averaged degree of polymerization of the multicomponent polyimide was found to be 56 as a result of the above described GPC method. The $N_A/N_B$ combination was out of the range according to the invention.

The resulting multicomponent polyimide blend solution was formed into film using a 0.5 mm doctor knife in accordance with the above described process of producing a polyimide film. The resulting film had a thickness of 30 μm. The characteristics of the film were measured. The results obtained are shown in Table below. The elastic modulus and tensile strength of the film were lower than those of the film of Example 3. The film showed macrophase separation and was cloudy.

Example 4

A random copolyimide (6FDA-s-BPDA-TSN-MASN-DABA) obtained from 6FDA, s-BPDA, TSN, 3,3'-diaminodiphenyl sulfone (MASN), and DABA (6FDA/s-BPDA molar ratio=4/3; TSN/MASN/DABA molar ratio=4/2/1)) and a polyimide (s-BPDA-TSN) obtained from s-BPDA and TSN were chosen as polyimide A and B, respectively.

$SP_A$ was 24.77 MPa$^{1/2}$, and $SP_B$ was 25.38 MPa$^{1/2}$, giving $|SP_B-SP_A|$ of 0.61 MPa$^{1/2}$.

$E_A$ was 4.17 GPa. $Tg_A$ (reference value) was 343° C. $E_B$ was 5.07 GPa. $Tg_B$ was higher than 400° C. Accordingly, $E_B/E_A$=1.21, and $|Tg_B-Tg_A|$>57° C.

In a separable flask were put 6.36 g of s-BPDA, 6.07 g of TSN, and 171 g of PCP as a solvent, and the system was allowed to polyimidate at 190° C. for 27 hours to obtain a polyimide B solution having a polymer concentration of 6.4 wt %. The polyimide B was found to have a number averaged degree of polymerization $N_B$ of 57 as measured by the above-described GPC method. To the polyimide solution were added 6.36 g of s-BPDA, 12.79 g of 6FDA, 8.10 g of TSN, 3.67 g of MASN, 1.12 g of DABA, and 20 g of PCP as a solvent. The resulting multicomponent polyimide blend solution was subjected to further polyimidation at 190° C. for 19 hours to obtain a multicomponent polyimide blend solution having a rotational viscosity of 1507 poise and a polymer concentration of 18 wt %. The number averaged degree of polymerization of the multicomponent polyimide was found to be 50 as measured by the above-described GPC method.

The resulting multicomponent polyimide blend solution was formed into film using a 0.5 mm doctor knife in accordance with the above described process of producing a polyimide film. The resulting film had a thickness of 34 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copolyimide (Comparative Example 6). As a result, $|\gamma-\gamma_{rand}|$ was 4.9 mN/m, $E/E_{rand}$ was 1.055, and $\Phi_s/\Phi_{s,rand}$ was 1.2.

Example 5

A random copolyimide (6FDA-TSN-MASN-DABA) obtained from 6FDA, TSN, MASN, and DABA (TSN/MASN/DABA molar ratio=1/2/1) and a polyimide (s-BPDA-TSN) obtained from s-BPDA and TSN were chosen as polyimide A and B, respectively.

$SP_A$ was 24.34 MPa$^{1/2}$, and $SP_B$ was 25.38 MPa$^{1/2}$, giving $|SP_B-SP_A|$ of 1.04 MPa$^{1/2}$.

$E_A$ was 3.76 GPa. $Tg_A$ (reference value) was 279° C. $E_B$ was 5.07 GPa. $Tg_B$ was higher than 400° C. Accordingly, $E_B/E_A$=1.35, and $Tg_B-Tg_A$>121° C.

In a separable flask were put 23.10 g of 6FDA, 3.66 g of TSN, 6.62 g of MASN, 2.03 g of DABA, and 153 g of PCP as a solvent, and the system was allowed to polyimidate at 190° C. for 6 hours to obtain a polyimide A solution having a polymer concentration of 18 wt %. The polyimide A was found to have a number averaged degree of polymerization $N_A$ of 4.9 as measured by the above-described GPC method.

In a separable flask were put 21.18 g of s-BPDA, 20.25 g of TSN, and 177 g of PCP as a solvent, and the system was allowed to polyimidate at 190° C. for 0.5 hours to obtain a polyimide B solution having a polymer concentration of 18 wt %. The polyimide B was found to have a number averaged degree of polymerization $N_B$ of 6.0 as measured by the above-described GPC method.

In a separable flask, 88 g of the polyimide A solution and 110 g of the polyimide B solution were mixed. The resulting multicomponent polyimide blend solution was subjected to further polyimidation at 190° C. for 19 hours to obtain a multicomponent polyimide blend solution having a rotational viscosity of 1376 poise and a polymer concentration of 18 wt %. The number averaged degree of polymerization of the multicomponent polyimide was found to be 57 as measured by the above-described GPC method.

The resulting multicomponent polyimide blend solution was formed into film using a 0.5 mm doctor knife in accordance with the above described process of producing a polyimide film. The resulting film had a thickness of 30 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copoyimide (Comparative Example 6). As a result, $|\gamma-\gamma_{rand}|$ was 5.0 mN/m, $E/E_{rand}$ was 1.175, and $\Phi_s/\Phi_{s,rand}$ was 1.7.

Example 6

The same chemical structures as used in Example 5 were chosen as polyimides A and B.

In a separable flask, 12.36 g of s-BPDA and 11.35 g of TSN were polyimidated in 165 g of PCP as a solvent at 190° C. for 27 hours to obtain a polyimide B solution having a polymer concentration of 11.8 wt %. The polyimide B was found to have a number averaged degree of polymerization $N_B$ of 76 as measured by the above described GPC method. To the polyimide solution were added 12.44 g of 6FDA, 2.08 g of TSN, 3.77 g of MASN, and 1.16 g of DABA together with 20 g of PCP as a solvent. The resulting multicomponent polyimide blend solution was subjected to further polyimidation reaction at 190° C. for 30 hours to obtain a multicomponent polyimide blend solution having a rotational viscosity of 911 poise and a polymer concentration of 18 wt %. The number averaged degree of polymerization of the multicomponent polyimide was found to be 45 as a result of the above described GPC method.

The resulting multicomponent polyimide blend solution was formed into film using a 0.5 mm doctor knife in accordance with the above described process of producing a polyimide film. The resulting film had a thickness of 36 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copoyimide (Comparative Example 6). As a result, $|\gamma-\gamma_{rand}|$ was 8.1 mN/m, $E/E_{rand}$ was 1.113, and $\Phi_s/\Phi_{s,rand}$ was 2.0.

Comparative Example 6

In a separable flask, 12.71 g of s-BPDA, 12.79 g of 6FDA, 14.17 g of TSN, 3.67 g of MASN, and 1.12 g of DABA were polyimidated in 191 g of PCP as a solvent at 190° C. for 73 hours to obtain a polyimide solution having a rotational viscosity of 1190 poise and a polymer concentration of 18 wt %. The number averaged degree of polymerization of the multicomponent polyimide was found to be 49 as a result of the above described GPC method.

The resulting multicomponent polyimide blend solution was formed into film using a 0.5 mm doctor knife in accordance with the above described process of producing a polyimide film. The resulting film had a thickness of 34 μm. The characteristics of the film were measured. The results obtained are shown in Table below.

The composition of the raw materials used in Comparative Example 6 was nearly the same as that of Example 6, but the resulting film had $\Phi_s$/f of 1.25, which was small. Furthermore, the elastic modulus, tensile strength, and elongation at break of the film were lower than those of the films of Examples 4, 5, and 6.

Example 7

A homopolyimide (s-BPDA-HFBAPP) obtained from s-BPDA and 2,2-bis(4-(4-aminophenoxy)phenyl)hexafluoropropane (HFBAPP) and a random copolyimide (s-BPDA-TPEQ-DADE) obtained from s-BPDA, 1,4-di(4-aminophenoxy)benzene (TPEQ), and DADE (TPEQ/DADE molar ratio=3/2) were chosen as polyimide A and B, respectively.

$SP_A$ was 22.67 MPa$^{1/2}$, and $SP_B$ was 23.80 MPa$^{1/2}$, giving $|SP_B-SP_A|$ of 1.13 MPa$^{1/2}$.

$E_A$ was 2.59 GPa. $Tg_A$ was 260° C. $E_B$ was 3.49 GPa. $Tg_B$ was 284° C. Accordingly, $E_B/E_A$=1.34, and $|Tg_B-Tg_A|$=24° C.

In a separable flask, 4.61 g of s-BPDA and 8.30 g of HFBAPP were polyimidated in 171 g of PCP as a solvent at 190° C. for 8 hours to obtain a polyimide A solution having a polymer concentration of 6.7 wt %. The polyimide A was found to have a number averaged degree of polymerization $N_A$ of 18.2 as measured by the above-described GPC method. To the polyimide solution were added 18.45 g of s-BPDA, 11.23 g of TPEQ, 5.13 g of DADE, and 20 g of PCP as a solvent. The resulting multicomponent polyimide blend solution was subjected to further polyimidation at 190° C. for 4 hours to obtain a multicomponent polyimide blend solution having a rotational viscosity of 1190 poise and a polymer concentration of is 19 wt %. The number averaged degree of polymerization of the multicomponent polyimide was found to be 39 as measured by the above-described GPC method.

The resulting multicomponent polyimide blend solution was formed into film using a 0.5 mm doctor knife in accordance with the above described process of producing a polyimide film. The resulting film had a thickness of 29 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copoyimide (Comparative Example 7). As a result, $|\gamma-\gamma_{rand}|$ was 1.9 mN/m, $E/E_{rand}$ was 1.083, and $\Phi_s/\Phi_{s,rand}$ was 2.0.

Comparative Example 7

In a separable flask, 23.07 g of s-BPDA, 8.30 g of HFBAPP, 11.23 g of TPEQ, and 5.13 g of DADE were polyimidated in 191 g of PCP as a solvent at 190° C. for 3 hours to obtain a polyimide solution having a rotational viscosity of 1246 poise and a polymer concentration of 19 wt %. The number averaged degree of polymerization of the polyimide was found to be 41 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below. The film was inferior to the film of Example 7 in elastic modulus and tensile strength.

Example 8

The same chemical structures as used in Example 7 were chosen as polyimides A and B (the ratio of polyimide A to polyimide B was different from Example 7).

In a separable flask, 6.92 g of s-BPDA and 12.44 g of HFBAPP were polyimidated in 180 g of PCP as a solvent at 190° C. for 15 hours to obtain a polyimide A solution having a polymer concentration of 9.3 wt %. The polyimide A was found to have a number averaged degree of polymerization $N_A$ of 22.5 as measured by the above described GPC method. To the polyimide solution were added 16.15 g of s-BPDA, 9.82 g of TPEQ, 4.49 g of DADE, and 20 g of PCP as a solvent. The resulting multicomponent polyimide blend solution was subjected to further polyimidation at 190° C. for 4 hours to obtain a multicomponent polyimide blend solution having a rotational viscosity of 1897 poise and a polymer concentration of 19 wt %. The number averaged degree of polymerization of the multicomponent polyimide was found to be 44 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below.

The surface tension γ, the elastic modulus E, and the surface fluorine concentration $\Phi_s$ of the resulting film were compared with the surface tension $\gamma_{rand}$, the elastic modulus $E_{rand}$, and the surface fluorine concentration $\Phi_{s,rand}$ of a film made of a polyimide A/polyimide B random copolyimide (Comparative Example 8). As a result, $|\gamma-\gamma_{rand}|$ was 0.9 mN/m, $E/E_{rand}$ was 1.078, and $\Phi_s/\Phi_{s,rand}$ was 1.8.

Comparative Example 8

In a separable flask, 23.07 g of s-BPDA, 12.44 g of HFBAPP, 9.82 g of TPEQ, and 4.49 g of DADE were polyimidated in 191 g of PCP as a solvent at 190° C. for 3 hours to obtain a polyimide solution having a rotational viscosity of 1079 poise and a polymer concentration of 19 wt %. The number averaged degree of polymerization of the polyimide was found to be 37 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below. The film was inferior to the film of Example 8 in elastic modulus, tensile strength, and elongation at break.

Example 9

A homopolyimide (s-BPDA-ADB) obtained from s-BPDA and 1,4-bis(3-aminopropyldimethylsilyl)benzene (ADB) and a homopolyimide (s-BPDA-TSN) obtained from s-BPDA and TSN were chosen as polyimide A and B, respectively.

$SP_A$ was 20.71 MPa$^{1/2}$, and $SP_B$ was 25.38 MPa$^{1/2}$, giving $|SP_B-SP_A|$ of 4.67 MPa$^{1/2}$.

$E_A$ was 0.02 GPa. $Tg_A$ was 125° C. $E_B$ was 5.07 GPa. $Tg_B$ was higher than 400° C. Accordingly, $E_B/E_A$=330, and $|Tg_B-Tg_A|$>275° C.

In a separable flask, 14.12 g of s-BPDA and 13.43 g of TSN were polyimidated in 126.1 g of PCP as a solvent at 190° C. for 15 hours to obtain a polyimide B solution having a polymer concentration of 17.0 wt %. The polyimide B was found to have a number averaged degree of polymerization $N_B$ of 57 as measured by the above-described GPC method. To the polyimide solution were added 3.53 g of s-BPDA, 3.78 g of ADB, and 33.6 g of PCP as a solvent. The resulting multicomponent polyimide blend solution was subjected to further polyimidation at 190° C. for 5 hours to obtain a multicomponent polyimide blend solution having a rotational viscosity of 930 poise and a polymer concentration of 17 wt %. The number averaged degree of polymerization of the multicomponent polyimide was found to be 31 as measured by the above-described GPC method.

The resulting multicomponent polyimide blend solution was formed into film using a 0.5 mm doctor knife in accordance with the above described process of producing a polyimide film. The resulting film had a thickness of 19 μm. The characteristics of the film were measured. The results obtained are shown in Table below.

The surface tension γ, the elastic modulus E, and the surface silicon concentration $\Phi_s$ of the resulting film were compared with the surface tension $\gamma_{rand}$, the elastic modulus $E_{rand}$, and the surface silicon concentration $\Phi_{s,rand}$ of a film made of a polyimide A/polyimide B random copolyimide (Comparative Example 9). As a result, $|\gamma-\gamma_{rand}|$ was 8.6 mN/m, $E/E_{rand}$ was 1.077, and $\Phi_s/\Phi_{s,rand}$ was 3.3.

Comparative Example 9

In a separable flask, 17.65 g of s-BPDA, 13.43 g of TSN, and 3.78 g of ADB were polyimidated in 159.7 g of PCP as a solvent at 190° C. for 17 hours to obtain a polyimide solution having a rotational viscosity of 781 poise and a polymer concentration of 17 wt %. The number averaged degree of polymerization of the multicomponent polyimide was found to be 49 as measured by the above-described GPC method.

The resulting multicomponent polyimide blend solution was formed into film using a 0.5 mm doctor knife in accordance with the above described process of producing a polyimide film. The resulting film had a thickness of 26 μm. The characteristics of the film were measured. The results obtained are shown in Table below.

The composition of the raw materials used here was nearly the same as that of Example 9, but the resulting film had $\Phi_s/f$ of 2.2, which was small. Furthermore, the film of Comparative Example 9 was inferior to the film of Example 9 in elastic modulus, tensile strength, and elongation at break.

Example 10

A homopolyimide (s-BPDA-BAPP) obtained from s-BPDA and 2,2-bis(4-(4-aminophenoxy)phenyl)propane (BAPP) and a homopolyimide (s-BPDA-m-ToL) obtained from s-BPDA and 2,2'-dimethyl-4,4'-diaminodiphenyl (m-ToL) were chosen as polyimide A and B, respectively.

$SP_A$ was 22.67 MPa$^{1/2}$, and $SP_B$ was 23.42 MPa$^{1/2}$, giving $|SP_B-SP_A|$ of 0.75 MPa$^{1/2}$.

$E_A$ was 2.52 GPa. $Tg_A$ was 260° C. $E_B$ was 6.53 GPa. $Tg_B$ was 330° C. Accordingly, $E_B/E_A$=2.59, and $|Tg_B-Tg_A|$=70° C.

In a separable flask, 5.88 g of s-BPDA and 4.33 g of m-ToL were polyimidated in 53.8 g of PCP as a solvent at 190° C. for 12 hours to obtain a polyimide B solution having a polymer concentration of 15 wt %. The polyimide B was found to have a number averaged degree of polymerization $N_B$ of 51 as measured by the above-described GPC method. To the polyimide solution were added 5.88 g of s-BPDA, 8.37 g of BAPP, and 76.7 g of PCP as a solvent. The resulting multicomponent polyimide blend solution was subjected to further polyimidation at 190° C. for 5 hours to obtain a multicomponent polyimide blend solution having a rotational viscosity of 751 poise and a polymer concentration of 15 wt %. The number averaged degree of polymerization of the multicomponent polyimide was found to be 68 as measured by the above-described GPC method.

The resulting multicomponent polyimide blend solution was formed into film using a 0.5 mm doctor knife in accordance with the above described process of producing a polyimide film. The resulting film had a thickness of 20 μm. The characteristics of the film were measured. The results obtained are shown in Table below.

The surface tension γ and the elastic modulus E of the resulting film were compared with the surface tension $\gamma_{rand}$ and the elastic modulus $E_{rand}$ of a film made of a polyimide A/polyimide B random copolyimide (Comparative Example 10). As a result, $|\gamma-\gamma_{rand}|$ was 6.6 mN/m, and $E/E_{rand}$ was 1.032.

A freeze-fractured surface of the resulting polyimide film was observed under an FE-SEM to obtain the nodule size (FIG. 10).

Comparative Example 10

In a separable flask, 11.77 g of s-BPDA, 4.33 g of m-ToL, and 8.37 g of BAPP were polyimidated in 130.5 g of PCP as a solvent at 190° C. for 17 hours to obtain a polyimide solution having a rotational viscosity of 552 poise and a polymer concentration of 15 wt %. The number averaged degree of polymerization of the polyimide was found to be 50 as measured by the above-described GPC method.

The resulting multicomponent polyimide blend solution was formed into film using a 0.5 mm doctor knife in accordance with the above described process of producing a polyimide film. The resulting film had a thickness of 20 μm. The characteristics of the film were measured. The results obtained are shown in Table below. The resulting film was inferior to the film of Example 10 in elastic modulus and tensile strength.

A freeze-fractured surface of the resulting polyimide film was observed under an FE-SEM to obtain the nodule size (FIG. 11).

Example 11

The same chemical structures as used in Example 10 were chosen as polyimides A and B (the ratio of polyimide A to polyimide B was different from Example 10).

In a separable flask, 8.24 g of s-BPDA and 6.06 g of m-ToL were polyimidated in 75.3 g of PCP as a solvent at 190° C. for 13 hours to obtain a polyimide B solution having a polymer concentration of 15 wt %. The polyimide B was found to have a number averaged degree of polymerization $N_B$ of 56 as measured by the above-described GPC method. To the polyimide solution were added 3.53 g of s-BPDA, 5.02 g of BAPP, and 46.1 g of PCP as a solvent. The resulting multicomponent polyimide blend solution was subjected to further polyimidation at 190° C. for 4 hours to obtain a multicomponent polyimide blend solution having a rotational viscosity of 460 poise and a polymer concentration of 15 wt %. The number averaged degree of polymerization of the multicomponent polyimide was found to be 42 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below.

The surface tension γ and the elastic modulus E of the resulting film were compared with the surface tension $\gamma_{rand}$ and the elastic modulus $E_{rand}$ of a film made of a polyimide A/polyimide B random copolyimide (Comparative Example 11). As a result, $|\gamma-\gamma_{rand}|$ was 1.5 mN/m, and $E/E_{rand}$ was 1.100.

Comparative Example 11

In a separable flask, 11.77 g of s-BPDA, 6.06 g of m-ToL, and 5.02 g of BAPP were polyimidated in 121.4 g of PCP as a solvent at 190° C. for 19 hours to obtain a polyimide solution having a rotational viscosity of 580 poise and a polymer concentration of 15 wt %. The number averaged degree of polymerization of the multicomponent polyimide was found to be 53 as measured by the above-described GPC method.

The resulting multicomponent polyimide blend solution was formed into film using a 0.5 mm doctor knife in accordance with the above described process of producing a polyimide film. The resulting film had a thickness of 29 μm. The characteristics of the film were measured. The results obtained are shown in Table below. The resulting film was inferior to the film of Example 11 in elastic modulus, tensile strength, and elongation at break.

Example 12

The same chemical structures as used in Example 10 were chosen as polyimides A and B (the ratio of polyimide A to polyimide B was different from Example 10).

In a separable flask, 3.53 g of s-BPDA and 2.60 g of m-ToL were polyimidated in 32.3 g of PCP as a solvent at 190° C. for 15 hours to obtain a polyimide B solution having a polymer concentration of 15 wt %. The polyimide B was found to have a number averaged degree of polymerization $N_B$ of 50 as measured by the above-described GPC method. To the polyimide solution were added 8.24 g of s-BPDA, 11.72 g of BAPP, and 107.4 g of PCP as a solvent. The resulting multicomponent polyimide blend solution was subjected to further polyimidation at 190° C. for 5 hours to obtain a multicomponent polyimide blend solution having a rotational viscosity of 420 poise and a polymer concentration of 15 wt %. The number averaged degree of polymerization of the multicomponent polyimide was found to be 39 as measured by the above-described GPC method.

The resulting multicomponent polyimide blend solution was formed into film using a 0.5 mm doctor knife in accordance with the above described process of producing a polyimide film. The resulting film had a thickness of 28 μm. The characteristics of the film were measured. The results obtained are shown in Table below.

The surface tension γ and the elastic modulus E of the resulting film were compared with the surface tension $\gamma_{rand}$ and the elastic modulus $E_{rand}$ of a film made of a polyimide A/polyimide B random copolyimide (Comparative Example 12). As a result, $|\gamma-\gamma_{rand}|$ was 2.4 mN/m, and End was 1.064.

Comparative Example 12

In a separable flask, 11.77 g of s-BPDA, 2.60 g of m-ToL, and 11.72 g of BAPP were polyimidated in 139.7 g of PCP as a solvent at 190° C. for 17 hours to obtain a polyimide solution having a rotational viscosity of 550 poise and a polymer concentration of 15 wt %. The number averaged degree of polymerization of the multicomponent polyimide was found to be 50 as measured by the above-described GPC method.

The resulting multicomponent polyimide blend solution was formed into film using a 0.5 mm doctor knife in accordance with the above described process of producing a polyimide film. The resulting film had a thickness of 24 μm. The characteristics of the film were measured. The results obtained are shown in Table below. The resulting film was inferior to the film of Example 12 in elastic modulus and tensile strength.

Example 13

A homopolyimide (s-BPDA-DADE) obtained from s-BPDA and DADE and a homopolyimide (s-BPDA-m-ToL) obtained from s-BPDA and m-ToL were chosen as polyimide A and B, respectively.

$SP_A$ was 24.12 $MPa^{1/2}$, and $SP_B$ was 23.42 $MPa^{1/2}$, giving $|SP_B-SP_A|$ of 0.70 $MPa^{1/2}$.

$E_A$ was 2.94 GPa. $Tg_A$ was 300° C. $E_B$ was 6.53 GPa. $Tg_B$ was 330° C. Accordingly, $E_B/E_A$=2.22, and $|Tg_B-Tg_A|$=30° C.

In a separable flask, 3.53 g of s-BPDA and 2.60 g of m-ToL were polyimidated in 32.3 g of PCP as a solvent at 190° C. for 11 hours to obtain a polyimide B solution having a polymer concentration of 15 wt %. The polyimide B was found to have a number averaged degree of polymerization $N_B$ of 49 as measured by the above-described GPC method. To the polyimide solution were added 8.24 g of s-BPDA, 5.72 g of DADE, and 73.4 g of PCP as a solvent. The resulting multicomponent polyimide blend solution was subjected to further polyimidation at 190° C. for 3 hours to obtain a multicomponent polyimide blend solution having a rotational viscosity of 508 poise and a polymer concentration of 15 wt %. The number averaged degree of polymerization of the multicomponent polyimide was found to be 46 as measured by the above-described GPC method.

The resulting multicomponent polyimide blend solution was formed into film using a 0.5 mm doctor knife in accordance with the above described process of producing a polyimide film. The resulting film had a thickness of 24 μm. The characteristics of the film were measured. The results obtained are shown in Table below.

The surface tension γ and the elastic modulus E of the resulting film were compared with the surface tension $γ_{rand}$ and the elastic modulus End of a film made of a polyimide A/polyimide B random copolyimide (Comparative Example 13). As a result, $|γ-γ_{rand}|$ was 4.0 mN/m, and $E/E_{rand}$ was 1.090.

Comparative Example 13

In a separable flask, 11.77 g of s-BPDA, 2.60 g of m-ToL, and 5.72 g of DADE were polyimidated in 105.7 g of PCP as a solvent at 190° C. for 13 hours to obtain a polyimide solution having a rotational viscosity of 470 poise and a polymer concentration of 15 wt %. The number averaged degree of polymerization of the multicomponent polyimide was found to be 45 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below. The resulting film was inferior to the film of Example 13 in elastic modulus, tensile strength, and elongation at break.

Example 14

The same chemical structures as used in Example 10 were chosen as polyimides A and B (the ratio of polyimide A to polyimide B was different from Example 10).

In a separable flask, 8.24 g of s-BPDA and 11.72 g of BAPP were polyimidated in 107.4 g of PCP as a solvent at 190° C. for 15 hours to obtain a polyimide A solution having a polymer concentration of 15 wt %. The polyimide A was found to have a number averaged degree of polymerization $N_A$ of 52 as measured by the above-described GPC method. To the polyimide solution were added 3.53 g of s-BPDA, 2.60 g of m-ToL, and 32.3 g of PCP as a solvent. The resulting multicomponent polyimide blend solution was subjected to further polyimidation at 190° C. for 5 hours to obtain a multicomponent polyimide blend solution having a rotational viscosity of 630 poise and a polymer concentration of 15 wt %. The number averaged degree of polymerization of the multicomponent polyimide was found to be 58 as measured by the above-described GPC method.

The resulting multicomponent polyimide blend solution was formed into film using a 0.5 mm doctor knife in accordance with the above described process of producing a polyimide film. The resulting film had a thickness of 21 μm. The characteristics of the film were measured. The results obtained are shown in Table below.

The surface tension γ and the elastic modulus E of the resulting film were compared with the surface tension $γ_{rand}$ and the elastic modulus $E_{rand}$ of a film made of a polyimide A/polyimide B random copolyimide (Comparative Example 14). As a result, $|γ-γ_{rand}|$ was 2.5 mN/m, and $E/E_{rand}$ was 1.155.

Comparative Example 14

In a separable flask, 11.77 g of s-BPDA, 2.60 g of m-ToL, and 11.72 g of BAPP were polyimidated in 139.7 g of PCP as a solvent at 190° C. for 14 hours to obtain a polyimide solution having a rotational viscosity of 621 poise and a polymer concentration of 15 wt %. The number averaged degree of polymerization of the multicomponent polyimide was found to be 56 as measured by the above-described GPC method.

The resulting multicomponent polyimide blend solution was formed into film using a 0.5 mm doctor knife in accordance with the above described process of producing a polyimide film. The resulting film had a thickness of 26 μm. The characteristics of the film were measured. The results obtained are shown in Table below. The resulting film was inferior to the film of Example 14 in elastic modulus and tensile strength.

Example 15

A homopolyimide (ETDA-BAPP) obtained from 3,3',4,4'-biphenyl ether tetracarboxylic acid dianhydride (ETDA) and BAPP and a homopolyimide (ETDA-m-ToL) obtained from ETDA and m-ToL were chosen as polyimide A and B, respectively.

$SP_A$ was 22.68 $MPa^{1/2}$, and $SP_B$ was 23.42 $MPa^{1/2}$, giving $|SP_B-SP_A|$ of 0.74 $MPa^{1/2}$.

$E_A$ was 3.15 GPa. $Tg_A$ was 204° C. $E_B$ was 3.42 GPa. $Tg_B$ was 285° C. Accordingly, $E_B/E_A$=1.08, and $|Tg_B-Tg_A|$=80° C.

In a separable flask, 4.65 g of ETDA and 3.25 g of m-ToL were polyimidated in 41.7 g of PCP as a solvent at 190° C. for 12 hours to obtain a polyimide B solution having a polymer concentration of 15 wt %. The polyimide B was found to have a number averaged degree of polymerization $N_B$ of 51 as measured by the above-described GPC method. To the polyimide solution were added 10.86 g of ETDA, 14.66 g of BAPP, and 137.4 g of PCP as a solvent. The resulting multicomponent polyimide blend solution was subjected to further polyimidation at 190° C. for 4 hours to obtain a multicomponent polyimide blend solution having a rotational viscosity of 577 poise and a polymer concentration of 15 wt %. The number averaged degree of polymerization of the multicomponent polyimide was found to be 52 as measured by the above-described GPC method.

The resulting multicomponent polyimide blend solution was formed into film using a 0.5 mm doctor knife in accordance with the above described process of producing a polyimide film. The resulting film had a thickness of 39 μm. The characteristics of the film were measured. The results obtained are shown in Table below.

The surface tension γ and the elastic modulus E of the resulting film were compared with the surface tension $\gamma_{rand}$ and the elastic modulus $E_{rand}$ of a film made of a polyimide A/polyimide B random copolyimide (Comparative Example 15). As a result, $|\gamma-\gamma_{rand}|$ was 3.0 mN/m, and $E/E_{rand}$ was 1.234.

Comparative Example 15

In a separable flask, 12.41 g of ETDA, 2.60 g of m-ToL, and 11.72 g of BAPP were polyimidated in 143.3 g of PCP as a solvent at 190° C. for 17 hours to obtain a polyimide solution having a rotational viscosity of 595 poise and a polymer concentration of 15 wt %. The number averaged degree of polymerization of the multicomponent polyimide was found to be 54 as measured by the above-describe GPC method.

The resulting multicomponent polyimide blend solution was formed into film using a 0.5 mm doctor knife in accordance with the above described process of producing a polyimide film. The resulting film had a thickness of 34 μm. The characteristics of the film were measured. The results obtained are shown in Table below. The resulting film was inferior to the film of Example 15 in elastic modulus, tensile strength, and elongation at break.

Example 16

A homopolyimide (s-BPDA-BAPP) obtained from s-BPDA and BAPP and a homopolyimide (s-BPDA-o-ToL) obtained from s-BPDA and 3,3'-dimethyl-4,4'-diaminodiphenyl (o-ToL) were chosen as polyimide A and B, respectively.

$SP_A$ was 22.67 MPa$^{1/2}$, and $SP_B$ was 23.42 MPa$^{1/2}$, giving $|SP_B-SP_A|$ of 0.75 MPa$^{1/2}$.

$E_A$ was 2.52 GPa. $Tg_A$ was 260° C. $E_B$ was 6.35 GPa. $Tg_B$ was higher than 400° C. Accordingly, $E_B/E_A$=2.52, and $Tg_B-Tg_A$|>140° C.

In a separable flask, 4.41 g of s-BPDA and 3.25 g of o-ToL were polyimidated in 40.4 g of PCP as a solvent at 190° C. for 8 hours to obtain a polyimide B solution having a polymer concentration of 15 wt %. The polyimide B was found to have a number averaged degree of polymerization $N_B$ of 48 as measured by the above-described GPC method. To the polyimide solution were added 10.3 g of s-BPDA, 14.66 g of BAPP, and 134.3 g of PCP as a solvent. The resulting multicomponent polyimide blend solution was subjected to further polyimidation at 190° C. for 5 hours to obtain a multicomponent polyimide blend solution having a rotational viscosity of 616 poise and a polymer concentration of 15 wt %. The number averaged degree of polymerization of the multicomponent polyimide was found to be 56 as measured by the above-described GPC method.

The resulting multicomponent polyimide blend solution was formed into film using a 0.5 mm doctor knife in accordance with the above described process of producing a polyimide film. The resulting film had a thickness of 35 μm. The characteristics of the film were measured. The results obtained are shown in Table below.

The surface tension γ and the elastic modulus E of the resulting film were compared with the surface tension $\gamma_{rand}$ and the elastic modulus $E_{rand}$ of a film made of a polyimide A/polyimide B random copolyimide (Comparative Example 16). As a result, $|\gamma-\gamma_{rand}|$ was 6.8 mN/m, and $E/E_{rand}$ was 1.042.

Comparative Example 16

In a separable flask, 11.77 g of s-BPDA, 2.60 g of o-ToL, and 14.66 g of BAPP were polyimidated in 139.7 g of PCP as a solvent at 190° C. for 17 hours to obtain a polyimide solution having a rotational viscosity of 651 poise and a polymer concentration of 15 wt %. The number averaged degree of polymerization of the multicomponent polyimide was found to be 60 as measured by the above-described GPC method.

The resulting multicomponent polyimide blend solution was formed into film using a 0.5 mm doctor knife in accordance with the above described process of producing a polyimide film. The resulting film had a thickness of 27 μm. The characteristics of the film were measured. The results obtained are shown in Table below. The resulting film was inferior to the film of Example 16 in elastic modulus and tensile strength.

Comparative Example 17

A homopolyimide (s-BPDA-TPEQ-DADE) obtained from s-BPDA and TPEQ and DADE and a homopolyimide (s-BPDA-DADE) obtained from s-BPDA and DADE were chosen as polyimide A and B, respectively.

$SP_A$ was 23.63 MPa$^{1/2}$, and $SP_B$ was 24.12 MPa$^{1/2}$, giving $|SP_B-SP_A|$ of 0.49 MPa$^{1/2}$. This indicates that the polyimides A and B are highly compatible with each other.

$E_A$ was 3.46 GPa. $Tg_A$ was 280° C. $E_B$ was 3.54 GPa. $Tg_B$ was 290° C. Accordingly, $E_B/E_A$=1.03, and $|Tg_B-Tg_A|$=10° C., indicating that the polyimides A and B have small differences in mechanical properties.

In a separable flask, 20.16 g of s-BPDA and 2.00 g of DADE were polyimidated in 138 g of PCP as a solvent at 190° C. for 2 hours. To the reaction system were added 17.54 g of TPEQ and 20 g of PCP as a solvent, followed by further polyimidation for an additional 3 hour period to obtain a polyimide A solution having a polymer concentration of 19 wt %. The polyimide A was found to have a number averaged degree of polymerization $N_A$ of 51 as measured by the above-described GPC method.

In a separable flask, 6.04 g of s-BPDA and 4.21 g of DADE were polyimidated in 134 g of PCP as a solvent at 190° C. for 11 hours to obtain a polyimide B solution having a polymer concentration of 19 wt %. The polyimide B was found to have a number averaged degree of polymerization $N_B$ of 44 as measured by the above-described GPC method.

In a separable flask, 137 g of the polyimide A solution and 49 g of the polyimide B solution were mixed. The resulting multicomponent polyimide blend solution was stirred at 130° C. for 3 hours to obtain a multicomponent polyimide blend solution having a rotational viscosity of 1990 poise and a polymer concentration of 19 wt %. The number averaged degree of polymerization of the multicomponent polyimide was found to be 45 as measured by the above-described GPC method.

The resulting multicomponent polyimide blend solution was formed into film using a 0.5 mm doctor knife in accordance with the above described process of producing a polyimide film. The resulting film had a thickness of 24 μm. The characteristics of the film were measured. The results obtained are shown in Table below.

The surface tension γ and the elastic modulus E of the resulting film were compared with the surface tension $\gamma_{rand}$ the elastic modulus $E_{rand}$ of a film made of a polyimide A/polyimide B random copolyimide (Comparative Example 19). As a result, $|\gamma-\gamma_{rand}|$ was as small as 0.2 mN/m or less, and $E/E_{rand}$ was only 0.986.

Comparative Example 18

The same chemical structures as used in Comparative Example 17 were chosen as polyimides A and B.

In a separable flask, 6.04 g of s-BPDA and 4.21 g of DADE were polyimidated in 131 g of PCP as a solvent at 190° C. for 15 hours to obtain a polyimide B solution having a polymer concentration of 6.7 wt %. The polyimide B was found to have a number averaged degree of polymerization $N_B$ of 46 as measured by the above described GPC method. To the reaction system were added 14.10 g of s-BPDA, 12.28 g of TPEQ, 1.40 g of DADE, and 20 g of a PCP solvent, followed by further polyimidation at 190° C. for 3 hours to obtain a multicomponent polyimide blend solution having a rotational viscosity of 1786 poise and a polymer concentration of 19 wt %. The number averaged degree of polymerization of the multicomponent polyimide was found to be 43 as a result of the above described GPC method.

The resulting multicomponent polyimide blend solution was formed into film using a 0.5 mm doctor knife in accordance with the above described process of producing a polyimide film. The resulting film had a thickness of 26 μm. The characteristics of the film were measured. The results obtained are shown in Table below.

The surface tension γ and the elastic modulus E of the resulting film were compared with the surface tension $\gamma_{rand}$ and the elastic modulus $E_{rand}$ of a film made of a polyimide A/polyimide B random copolyimide (Comparative Example 19). As a result, $|\gamma-\gamma_{rand}|$ was as small as 0.2 mN/m or less, and $E/E_{rand}$ and was only 1.003.

Comparative Example 19

In a separable flask, 20.14 g of s-BPDA, 12.28 g of TPEQ, and 5.61 g of DADE were polyimidated in 151 g of a PCP solvent to obtain a polyimide solution having a rotational viscosity of 1042 poise and a polymer concentration of 19 wt %. The number averaged degree of polymerization of the polyimide was found to be 36 as a result of the above described GPC method.

The resulting multicomponent polyimide blend solution was formed into film using a 0.5 mm doctor knife in accordance with the above described process of producing a polyimide film. The resulting film had a thickness of 24 μm. The characteristics of the film were measured. The results obtained are shown in Table below.

Example 17

The multicomponent polyimide blend solution prepared in Example 10 was formed into a very thin film using a 0.2 mm doctor knife in accordance with the above described process of preparing a polyimide film. The resulting film had a thickness of 3 μm. The characteristics of the film were measured. The results obtained are shown in Table below.

The surface tension γ and the elastic modulus E of the resulting thin film were compared with the surface tension $\gamma_{rand}$ and the elastic modulus $E_{rand}$ of a film made of a polyimide A/polyimide B random copolyimide (Comparative Example 20). As a result, $|\gamma-\gamma_{rand}|$ was 2.4 mN/m, and $E/E_{rand}$ was 1.170.

Comparative Example 20

The multicomponent polyimide blend solution prepared in Comparative Example 10 was formed into a very thin film using a 0.2 mm doctor knife in the same manner as in Example 17. The resulting film had a thickness of 4 μm. The characteristics of the film were measured. The results obtained are shown in Table below. The resulting film was inferior to the film of Example 17 in elastic modulus, tensile strength, and elongation at break.

Example 18

The multicomponent polyimide blend solution prepared in Example 12 was formed into a very thin film using a 0.2 mm doctor knife in the same manner as in Example 17. The resulting film had a thickness of 5 μm. The characteristics of the film were measured. The results obtained are shown in Table below.

The surface tension γ and the elastic modulus E of the resulting thin film were compared with the surface tension $\gamma_{rand}$ and the elastic modulus $E_{rand}$ of a film made of a polyimide A/polyimide B random copolyimide (Comparative Example 21). As a result, $|\gamma-\gamma_{rand}|$ was 6.7 mN/m, and $E/E_{rand}$ was 1.175.

Comparative Example 21

The multicomponent polyimide blend solution prepared in Comparative Example 12 was formed into a very thin film using a 0.2 mm doctor knife in the same manner as in Example 17. The resulting film had a thickness of 6 μm. The characteristics of the film were measured. The results obtained are shown in Table below. The resulting film was inferior to the film of Example 18 in elastic modulus, tensile strength, and elongation at break.

Example 19

The multicomponent polyimide blend solution prepared in Example 16 was formed into a very thin film using a 0.2 mm doctor knife in the same manner as in Example 17. The resulting film had a thickness of 4 μm. The characteristics of the film were measured. The results obtained are shown in Table below.

The surface tension γ and the elastic modulus E of the resulting thin film were compared with the surface tension $\gamma_{rand}$ and the elastic modulus $E_{rand}$ of a film made of a polyimide A/polyimide B random copolyimide (Comparative Example 22). As a result, $|\gamma-\gamma_{rand}|$ was 3.7 mN/m, and $E/E_{rand}$ was 1.314.

Comparative Example 22

The multicomponent polyimide blend solution prepared in Comparative Example 16 was formed into a very thin film using a 0.2 mm doctor knife in the same manner as in Example 17. The resulting film had a thickness of 4 μm. The characteristics of the film were measured. The results obtained are shown in Table below. The resulting film was inferior to the film of Example 19 in elastic modulus, tensile strength, and elongation at break.

Example 20

The multicomponent polyimide blend solution prepared in Example 15 was formed into a very thin film using a 0.2 mm doctor knife in the same manner as in Example 17. The resulting film had a thickness of 7 μm. The characteristics of the film were measured. The results obtained are shown in Table below.

The surface tension γ and the elastic modulus E of the resulting thin film were compared with the surface tension $\gamma_{rand}$ and the elastic modulus $E_{rand}$ of a film made of a polyimide A/polyimide B random copolyimide (Comparative Example 23). As a result, $|\gamma - \gamma_{rand}|$ was 3.6 mN/m, and $E/E_{rand}$ was 1.089.

Comparative Example 23

The multicomponent polyimide blend solution prepared in Comparative Example 15 was formed into a very thin film using a 0.2 mm doctor knife in the same manner as in Example 17. The resulting film had a thickness of 7 μm. The characteristics of the film were measured. The results obtained are shown in Table below. The resulting film was inferior to the film of Example 20 in elastic modulus, tensile strength, and elongation at break.

Comparative Example 24

A polyimide film was obtained in the same manner as in Example 2, except that $N_A=1.7$ and $N_B=0.5$. The elastic modulus E of the resulting film was only 4.10 GPa, the ratio of which to the elastic modulus $E_{rand}$ of the film of a polyimide A/polyimide B random copolyimide (Comparative Example 2), $E/E_{rand}$, was as small as 0.901.

Comparative Example 25

A polyimide film was obtained in the same manner as in Example 4, except that $N_A=0.5$ and $N_B=7.0$. The resulting film was almost equal in elastic modulus, tensile strength, and elongation at break to the film of a polyimide A/polyimide B random copolyimide (Comparative Example 6).

The results of Examples 1 through 8 and Comparative Examples 1 through 8 are shown in Table 1, those of Example 9 and Comparative Example 9 in Table 2, those of Examples 10 to 16 and Comparative Example 10 to 19 in Table 3, and those of Examples 17 to 20 and Comparative Examples 20 to 23 in Table 4. In the tables, B/A is a molar ratio of diamine component (B) to tetracarboxylic acid component (A).

TABLE 1

| | | Multicomponent Polyimide Blend Solution | | | | | | |
|---|---|---|---|---|---|---|---|---|
| | Polyimide A | | Polyimide B | | | Number averaged Polymerization Degree | | Solution Viscosity (poise) |
| | Monomer Component | $N_A$ | Monomer Component | $N_B$ | Total Monomer Composition | after Step 1 | after Step 2 | (Polymer Concentration) |
| Example 1 SY4-32 | 6FDA 12.44 g TSN 8.30 g (B/A = 1.081) | 0.5 | s-BPDA 12.36 g TSN 11.38 g (B/A = 0.988) | 75 | s-BPDA 12.36 g 6FDA 12.44 g TSN 19.68 g (B/A = 1.025) | 1.2 | 40 | 2306 (18 wt %) |
| Comp. Example 1 SY4-34 | | | s-BPDA 12.36 g 6FDA 12.44 g TSN 19.68 g (B/A = 1.025) | | | | 44 | 2195 (18 wt %) |
| Example 2 SY4-36 | 6FDA 12.44 g DABA 4.61 g (B/A = 1.081) | 0.5 | s-BPDA 12.36 g TSN 11.38 g (B/A = 0.988) | 75 | s-BPDA 12.36 g 6FDA 12.44 g TSN 11.38 g DABA 4.61 g (B/A = 1.025) | 1.2 | 78 | 2120 (18 wt %) |
| Comp. Example 2 SY4-35 | | | s-BPDA 12.36 g 6FDA 12.44 g TSN 11.81 g DABA 4.37 g (B/A = 1.025) | | | | 44 | 1655 (18 wt %) |
| Example 3 SY4-18 | 6FDA 12.44 g TSN 5.21 g DABA 1.73 g (B/A = 1.085) | 0.5 | s-BPDA 12.36 g TSN 11.35 g (B/A = 0.985) | 77 | s-BPDA 12.36 g 6FDA 12.44 g TSN 16.56 g DABA 1.73 g (B/A = 1.025) | 1.2 | 41 | 1618 (18 wt %) |
| Comp. Example 3 SY4-15 | | | s-BPDA 12.36 g 6FDA 12.44 g TSN 16.73 g DABA 1.64 g (B/A = 1.025) | | | | 37 | 2623 (18 wt %) |
| Comp. Example 4 SY5-12 | 6FDA 12.69 g TSN 4.78 g DABA 1.59 g (B/A = 0.976) | 30 | s-BPDA 10.38 g TSN 9.02 g DADE 0.73 g (B/A = 1.035) | 63 | s-BPDA 10.38 g 6FDA 12.69 g TSN 13.80 g DADE 0.73 g DABA 0.73 g (B/A = 0.992) | 44 | 76 | 1618 (18 wt %) |

TABLE 1-continued

| | | | | | | | | |
|---|---|---|---|---|---|---|---|---|
| Comp. Example 5 SY5-1 | 6FDA 12.24 g<br>TSN 4.82 g<br>DABA 1.60 g<br>(B/A = 1.020) | 44 | s-BPDA 10.38 g<br>TSN 9.02 g<br>DADE 0.73 g<br>(B/A = 1.035) | 66 | s-BPDA 10.38 g<br>6FDA 12.24 g<br>TSN 13.84 g<br>DADE 0.73 g<br>DABA 1.60 g<br>(B/A = 1.029) | 55 | 56 | 2753<br>(19 wt %) |
| Example 4 SY4-22 | s-BPDA 6.36 g<br>6FDA 12.79 g<br>TSN 8.10 g<br>MASN 3.67 g<br>DABA 1.12 g<br>(B/A = 1.025) | 0.5 | s-BPDA 6.36 g<br>TSN 6.07 g<br>(B/A = 1.025) | 57 | s-BPDA 12.72 g<br>6FDA 12.79 g<br>TSN 14.17 g<br>MASN 3.67 g<br>DABA 1.12 g<br>(B/A = 1.025) | 0.7 | 50 | 1507<br>(18 wt %) |
| Example 5 SY5-17 | 6FDA 10.86 g<br>TSN 1.72 g<br>MASN 3.11 g<br>DABA 0.95 g<br>(B/A = 1.025) | 4.9 | s-BPDA 10.79 g<br>TSN 10.31 g<br>(B/A = 1.025) | 6.0 | s-BPDA 10.79 g<br>6FDA 10.86 g<br>TSN 12.03 g<br>MASN 3.11 g<br>DABA 0.95 g<br>(B/A = 1.025) | 5.5 | 57 | 1376<br>(18 wt %) |
| Example 6 SY4-28 | 6FDA 12.44 g<br>TSN 2.08 g<br>MASN 3.77 g<br>DABA 1.16 g<br>(B/A = 1.085) | 0.5 | s-BPDA 12.36 g<br>TSN 11.35 g<br>(B/A = 0.985) | 76 | s-BPDA 12.36 g<br>6FDA 12.44 g<br>TSN 13.43 g<br>MASN 3.77 g<br>DABA 1.16 g<br>(B/A = 1.025) | 1.2 | 45 | 911<br>(18 wt %) |
| Comp. Example 6 SY4-19 | | | s-BPDA 12.71 g<br>6FDA 12.79 g<br>TSN 14.17 g<br>MASN 3.67 g<br>DABA 1.12 g<br>(B/A = 1.025) | | | | 49 | 1190<br>(18 wt %) |
| Example 7 SY6-11-2 | s-BPDA 4.61 g<br>HFBAPP 8.30 g<br>(B/A = 1.02) | 18.2 | s-BPDA 18.45 g<br>TPEQ 11.23 g<br>DADE 5.13 g<br>(B/A = 1.02) | 0.5 | s-BPDA 23.07 g<br>HFBAPP 8.30 g<br>TPEQ 11.23 g<br>DADE 5.13 g<br>(B/A = 1.02) | 0.6 | 39 | 1190<br>(19 wt %) |
| Comp. Example 7 SY6-16-2 | | | s-BPDA 23.07 g<br>HFBAPP 8.30 g<br>TPEQ 11.23 g<br>DADE 5.13 g<br>(B/A = 1.02) | | | | 41 | 1246<br>(19 wt %) |
| Example 8 SY-18-2 | s-BPDA 6.92 g<br>HFBAPP 12.44 g<br>(B/A = 1.02) | 22.5 | s-BPDA 16.15 g<br>TPEQ 9.82 g<br>DADE 4.49 g<br>(B/A = 1.02) | 0.5 | s-BPDA 23.07 g<br>HFBAPP 12.44 g<br>TPEQ 9.82 g<br>DADE 4.49 g<br>(B/A = 1.02) | 0.7 | 44 | 1897<br>(19 wt %) |
| Comp. Example 8 SY6-17-2 | | | s-BPDA 23.07 g<br>HFBAPP 12.44 g<br>TPEQ 9.82 g<br>DADE 4.49 g<br>(B/A = 1.02) | | | | 37 | 1079<br>(19 wt %) |

| | Results of Evaluation of Film | | | | | | |
|---|---|---|---|---|---|---|---|
| | | | | Tensile Test | | | |
| | Surface Tension (mN/m) | $\delta = |\gamma - \gamma_{rand}|$ | $\Phi_s/f$ (F) | Elastic Modulus (GPa) | Tensile strength (MPa) | Elongation at Break (%) | Film Cloudiness |
| Example 1 SY4-32 | 33.1 | 5.0 | 2.36 | 4.90 | 205 | 14.1 | no |
| Comp. Example 1 SY4-34 | 38.1 | 0 | 1.05 | 4.81 | 202 | 27.9 | no |
| Example 2 SY4-36 | 40.6 | 4.6 | 2.44 | 5.17 | 223 | 20.6 | no |
| Comp. Example 2 SY4-35 | 36.0 | 0 | 1.04 | 4.55 | 192 | 9.5 | no |
| Example 3 SY4-18 | 34.1 | 6.8 | 2.45 | 4.64 | 199 | 9.3 | no |
| Comp. Example 3 SY4-15 | 40.9 | 0 | 1.23 | 4.47 | 174 | 11.8 | no |
| Comp. Example 4 SY5-12 | 37.1 | 3.8 | 2.24 | 4.54 | 187 | 10.9 | yes |
| Comp. Example 5 SY5-1 | 37.2 | 3.7 | 2.42 | 4.46 | 184 | 9.5 | yes |

TABLE 1-continued

| | | | | | | | | |
|---|---|---|---|---|---|---|---|---|
| Example 4 SY4-22 | 32.0 | 4.9 | 1.50 | 4.39 | 189 | 11.0 | no | |
| Example 5 SY5-17 | 31.9 | 5.0 | 2.11 | 4.89 | 212 | 10.3 | no | |
| Example 6 SY4-28 | 28.8 | 8.1 | 2.54 | 4.63 | 206 | 13.7 | no | |
| Comp. Example 6 SY4-19 | 36.9 | 0 | 1.25 | 4.16 | 173 | 9.2 | no | |
| Example 7 SY6-11-2 | 24.9 | 1.8 | 2.47 | 3.51 | 194 | 109.6 | no | |
| Comp. Example 7 SY6-16-2 | 26.8 | 0 | 1.25 | 3.24 | 159 | 120.9 | no | |
| Example 8 SY-18-2 | 26.3 | 0.9 | 1.75 | 3.45 | 211 | 110.7 | no | |
| Comp. Example 8 SY6-17-2 | 27.2 | 0 | 0.99 | 3.20 | 111 | 15.6 | no | |

TABLE 2

| | Multicomponent Polyimide Blend Solution | | | | | | |
|---|---|---|---|---|---|---|---|
| | Polyimide A | | Polyimide B | | | Number averaged Polymerization Degree | Solution Viscosity (poise) |
| | Monomer Component | $N_A$ | Monomer Component | $N_B$ | Total Monomer Composition | after Step 1 / after Step 2 | (Polymer Concentration) |
| Example 9 H-203 | s-BPDA 3.53 g ADB 3.78 g (B/A = 1.02) | 0.5 | s-BPDA 14.12 g TSN 13.43 g (B/A = 1.02) | 57 | s-BPDA 17.65 g TSN 13.43 g ADB 3.78 g (B/A = 1.02) | 2.42 / 31 | 930 (17 wt %) |
| Comp. Example 9 H-203 | | | s-BPDA 17.65 g TSN 13.43 g ADB 3.78 g (B/A = 1.02) | | | 49 | 781 (17 wt %) |

| | Results of Evaluation of Film | | | | | | |
|---|---|---|---|---|---|---|---|
| | | | | Tensile Test | | | |
| | Surface Tension (mN/m) | $\delta = |\gamma - \gamma_{rand}|$ | $\Phi_s/f$ (Si) | Elastic Modulus (GPa) | Tensile strength (MPa) | Elongation at Break (%) | Film Cloudiness |
| Example 9 H-203 | 24.5 | 8.6 | 7.30 | 9.80 | 448 | 14.9 | no |
| Comp. Example 9 H-203 | 15.9 | 0 | 2.20 | 9.10 | 418 | 12.3 | no |

TABLE 3

| | Multicomponent Polyimide Blend Solution | | | | | | |
|---|---|---|---|---|---|---|---|
| | Polyimide A | | Polyimide B | | | Number averaged Polymerization Degree | Solution Viscosity (poise) |
| | Monomer Component | $N_A$ | Monomer Component | $N_B$ | Total Monomer Composition | after Step 1 / after Step 2 | (Polymer Concentration) |
| Example 10 H-265 | s-BPDA 5.88 g BAPP 8.37 g (B/A = 1.02) | 0.5 | s-BPDA 5.88 g m-ToL 4.33 g (B/A = 1.02) | 51 | s-BPDA 11.77 g m-ToL 4.33 g BAPP 8.37 g (B/A = 1.02) | 1.0 / 68 | 751 (15 wt %) |
| Comp. Example 10 | | | s-BPDA 11.77 g m-ToL 4.33 g | | | 50.0 | 552 (15 wt %) |

TABLE 3-continued

| | | | | | | | | |
|---|---|---|---|---|---|---|---|---|
| H-265 | | | BAPP 8.37 g (B/A = 1.02) | | | | | |
| Example 11 H-266 | s-BPDA 3.53 g BAPP 5.02 g (B/A = 1.02) | 0.5 | s-BPDA 8.24 g m-ToL 6.06 g (B/A = 1.02) | 56 | s-BPDA 11.77 g m-ToL 6.06 g BAPP 5.02 g (B/A = 1.02) | 1.6 | 42 | 460 (15 wt %) |
| Comp. Example 11 H-266 | | | s-BPDA 11.77 g m-ToL 6.06 g BAPP 5.02 g (B/A = 1.02) | | | | 53.0 | 580 (15 wt %) |
| Example 12 H-267 | s-BPDA 8.24 g BAPP 11.72 g (B/A = 1.02) | 0.5 | s-BPDA 3.53 g m-ToL 2.6 g (B/A = 1.02) | 50 | s-BPDA 11.77 g m-ToL 2.6 g BAPP 11.72 g (B/A = 1.02) | 0.7 | 39 | 420 (15 wt %) |
| Comp. Example 12 H-267 | | | s-BPDA 11.77 g m-ToL 2.6 g BAPP 11.72 g (B/A = 1.02) | | | | 50 | 550 (15 wt %) |
| Example 13 H-268 | s-BPDA 8.24 g DADE 5.72 g (B/A = 1.02) | 0.5 | s-BPDA 3.53 g m-ToL 2.6 g (B/A = 1.02) | 49 | s-BPDA 11.77 g m-ToL 2.6 g DADE 5.72 g (B/A = 1.02) | 0.7 | 46 | 508 (15 wt %) |
| Comp. Example 13 H-268 | | | s-BPDA 11.77 g m-ToL 2.6 g DADE 5.72 g (B/A = 1.02) | | | | 45.0 | 470 (15 wt %) |
| Example 14 H-283 | s-BPDA 8.24 g BAPP 11.72 g (B/A = 1.02) | 52 | s-BPDA 3.53 g m-ToL 2.60 g (B/A = 1.02) | 0.5 | s-BPDA 11.77 g m-ToL 2.60 g BAPP 11.72 g (B/A = 1.02) | 0.7 | 58 | 630 (15 wt %) |
| Comp. Example 14 H-283 | | | s-BPDA 11.77 g m-ToL 2.60 g BAPP 11.72 g (B/A = 1.02) | | | | 56 | 621 (15 wt %) |
| Example 15 H-285 | ETDA 10.86 g BAPP 14.66 g (B/A = 1.02) | 0.5 | ETDA 4.65 g m-ToL 3.25 g (B/A = 1.02) | 51 | ETDA 15.51 g m-ToL 3.25 g BAPP 14.66 g (B/A = 1.02) | 0.7 | 52 | 577 (15 wt %) |
| Comp. Example 15 H-285 | | | ETDA 12.41 g m-ToL 2.60 g BAPP 11.72 g (B/A = 1.02) | | | | 54 | 595 (15 wt %) |
| Example 16 H-282 | s-BPDA 10.30 g BAPP 14.66 g (B/A = 1.02) | 0.5 | s-BPDA 4.41 g o-ToL 3.25 g (B/A = 1.02) | 48 | s-BPDA 14.71 g o-ToL 3.25 g BAPP 14.66 g (B/A = 1.02) | 0.7 | 56.0 | 616 (15 wt %) |
| Comp. Example 16 H-282 | | | s-BPDA 11.77 g o-ToL 2.6 g BAPP 14.66 g (B/A = 1.02) | | | | 60.0 | 651 (15 wt %) |
| Comp. Example 17 SY5-24 | s-BPDA 14.10 g TPEQ 12.28 g DADE 1.40 g (B/A = 1.022) | 51 | s-BPDA 6.04 g DADE 4.21 g (B/A = 1.022) | 44 | s-BPDA 20.14 g TPEQ 12.28 g DADE 5.61 g (B/A = 1.022) | 45.9 | 45 | 1990 (19 wt %) |
| Comp. Example 18 SY6-1 | s-BPDA 14.10 g TPEQ 12.28 g DADE 1.40 g (B/A = 1.022) | 0.5 | s-BPDA 6.04 g DADE 4.21 g (B/A = 1.022) | 46 | s-BPDA 20.14 g TPEQ 12.28 g DADE 5.61 g (B/A = 1.022) | 1.6 | 43 | 1786 (19 wt %) |
| Comp. Example 19 SY6-2 | s-BPDA 20.14 g TPEQ 12.28 g DADE 5.61 g (B/A = 1.022) | | | | | | 36 | 1042 (19 wt %) |

| | Results of Evaluation of Film | | | | | | |
|---|---|---|---|---|---|---|---|
| | | | | Tensile Test | | | |
| | Surface Tension (mN/m) | $\delta = |\gamma - \gamma_{rand}|$ | $\Phi_s/f$ | Elastic Modulus (GPa) | Tensile strength (MPa) | Elongation at Break (%) | Film Cloudiness |
| Example 10 H-265 | 31.1 | 6.6 | — | 4.55 | 322 | 68.9 | no |
| Comp. Example 10 H-265 | 24.5 | 0 | — | 4.41 | 267 | 81.6 | no |
| Example 11 H-266 | 24.0 | 1.5 | — | 5.17 | 331 | 51.5 | no |

TABLE 3-continued

|   |   |   |   |   |   |   |   |
|---|---|---|---|---|---|---|---|
| Comp. Example 11 H-266 | 25.5 | 0 | — | 4.70 | 262 | 49.4 | no |
| Example 12 H-267 | 27.6 | 2.4 | — | 3.84 | 210 | 68.3 | no |
| Comp. Example 12 H-267 | 25.2 | 0 | — | 3.61 | 197 | 68.3 | no |
| Example 13 H-268 | 27.8 | 4.0 | — | 4.47 | 288 | 58.1 | no |
| Comp. Example 13 H-268 | 23.8 | 0 | — | 4.10 | 258 | 52.9 | no |
| Example 14 H-283 | 27.7 | 2.5 | — | 3.79 | 154 | 47.2 | no |
| Comp. Example 14 H-283 | 25.2 | 0 | — | 3.28 | 144 | 50.2 | no |
| Example 15 H-285 | 21.8 | 3.0 | — | 2.95 | 124 | 43.2 | no |
| Comp. Example 15 H-285 | 24.8 | 0 | — | 2.39 | 92 | 36.8 | no |
| Example 16 H-282 | 30.3 | 6.8 | — | 3.23 | 139 | 35.6 | no |
| Comp. Example 16 H-282 | 23.5 | 0 | — | 3.10 | 139 | 34.4 | no |
| Comp. Example 17 SY5-24 | 30.5 | 3.1 | — | 3.46 | 187 | 97.1 | no |
| Comp. Example 18 SY6-1 | 23.5 | 10.1 | — | 3.52 | 185 | 94.5 | no |
| Comp. Example 19 SY6-2 | 33.6 | 0 | — | 3.51 | 183 | 97.4 | no |

TABLE 4

Multicomponent Polyimide Blend Solution

| | Polyimide A | | Polyimide B | | | Number averaged Polymerization Degree | | Solution Viscosity (poise) |
|---|---|---|---|---|---|---|---|---|
| | Monomer Component | $N_A$ | Monomer Component | $N_B$ | Total Monomer Composition | after Step 1 | after Step 2 | (Polymer Concentration) |
| Example 17 H-265 | s-BPDA 5.88 g BAPP 8.37 g (B/A = 1.02) | 0.5 | s-BPDA 5.88 g m-ToL 4.33 g (B/A = 1.02) | 51 | s-BPDA 11.77 g m-ToL 4.33 g BAPP 8.37 g (B/A = 1.02) | 1.0 | 68 | 751 (15 wt %) |
| Comp. Example 20 H-265 | | | s-BPDA 11.77 g m-ToL 4.33 g BAPP 8.37 g (B/A = 1.02) | | | | 50.0 | 552 (15 wt %) |
| Example 18 H-267 | s-BPDA 8.24 g BAPP 11.72 g (B/A = 1.02) | 0.5 | s-BPDA 3.53 g m-ToL 2.6 g (B/A = 1.02) | 50 | s-BPDA 11.77 g m-ToL 2.6 g BAPP 11.72 g (B/A = 1.02) | 0.7 | 39 | 420 (15 wt %) |
| Comp. Example 21 H-267 | | | s-BPDA 11.77 g m-ToL 2.6 g BAPP 11.72 g (B/A = 1.02) | | | | 50 | 550 (15 wt %) |
| Example 19 H-282 | s-BPDA 10.30 g BAPP 14.66 g (B/A = 1.02) | 0.5 | s-BPDA 4.41 g o-ToL 3.25 g (B/A = 1.02) | 48 | s-BPDA 14.71 g o-ToL 3.25 g BAPP 14.66 g (B/A = 1.02) | 0.7 | 56.0 | 616 (15 wt %) |
| Comp. Example 22 H-282 | | | s-BPDA 11.77 g o-ToL 2.6 g BAPP 14.66 g (B/A = 1.02) | | | | 60.0 | 651 (15 wt %) |
| Example 20 H-285 | ETDA 10.86 g BAPP 14.66 g (B/A = 1.02) | 0.5 | EDTA 4.65 g m-ToL 3.25 g (B/A = 1.02) | 51 | EDTA 15.51 g m-ToL 3.25 g BAPP 14.66 g (B/A = 1.02) | 0.7 | 52 | 577 (15 wt %) |

TABLE 4-continued

| | | | | | | | | |
|---|---|---|---|---|---|---|---|---|
| Comp. Example 23 H-285 | ETDA 12.41 g m-ToL 2.6 g BAPP 11.72 g (B/A = 1.02) | | | | 54 | | 595 (15 wt %) | |

| | | Results of Evaluation of Film | | | | | |
|---|---|---|---|---|---|---|---|
| | | | | | Tensile Test | | |
| | | Surface Tension (mN/m) | $\delta = \|\gamma - \gamma_{rand}\|$ | $\Phi_s/f$ | Elastic Modulus (GPa) | Tensile strength (MPa) | Elongation at Break (%) | Film Cloudiness |
| Example 17 H-265 | | 25.7 | 2.4 | — | 4.60 | 283 | 67.8 | no |
| Comp. Example 20 H-265 | | 23.3 | 0 | — | 3.93 | 163 | 59.6 | no |
| Example 18 H-267 | | 29.5 | 6.7 | — | 5.04 | 293 | 81.6 | no |
| Comp. Example 21 H-267 | | 22.8 | 0 | — | 4.29 | 195 | 63.4 | no |
| Example 19 H-282 | | 24.4 | 3.7 | — | 3.35 | 117 | 36.5 | no |
| Comp. Example 22 H-282 | | 28.1 | 0 | — | 2.55 | 81 | 14.3 | no |
| Example 20 H-285 | | 21.6 | 3.6 | — | 2.45 | 76 | 10.2 | no |
| Comp. Example 23 H-285 | | 25.2 | 0 | — | 2.25 | 75 | 8.4 | no |

INDUSTRIAL APPLICABILITY

The present invention provides a multicomponent polyimide film with a modified surface. The polyimide film has a largely modified surface tension compared with, for example, a polyimide film in which all the starting materials used in the polyimide film of the invention are randomly bonded to one another.

The invention claimed is:

1. A process of producing a polyimide film of a multicomponent polyimide comprising the steps of:
   (1) mixing a polyimide component A and a polyimide component B to prepare a multicomponent polyimide blend solution,
   the polyimide component A being raw materials of a polyimide A and/or a polyimidation product of the raw materials, and the polyimide component B being raw materials of a polyimide B and/or a polyimidation product of the raw materials,
   the polyimide components A and B being combined to satisfy the relation: $2.35 \times N_A^{-2.09} < N_B < 450 \times N_A^{-1.12}$, wherein,
   the absolute difference between solubility parameter $SP_A$ of the polyimide A and solubility parameter $SP_B$ of the polyimide B, $|SP_B - SP_A|$, is 0.5 MPa$^{1/2}$ or greater,
   $N_A$ is the number average polymerization degree of the polyimide component A and $N_B$ is the number average polymerization degree of the polyimide component B, provided that the degree of polymerization of each of unreacted polyimide raw materials, a tetracarboxylic acid component and a diamine component, is taken as 0.5;
   (2) subjecting the multicomponent polyimide blend solution to further polyimidation reaction; and
   (3) removing a solvent from a film of the multicomponent polyimide obtained in step (2).

2. The process according to claim 1, wherein the ratio of elastic modulus $E_B$ of a film of the polyimide B to elastic modulus $E_A$ of a film of the polyimide A, $E_B/E_A$, is 1.05 or higher.

3. The process according to claim 1, wherein glass transition temperature $Tg_A$ of the polyimide A is lower than glass transition temperature $Tg_B$ of the polyimide B by 20° C. or more.

4. The process according to claim 1, wherein the polyimide A contains a fluorine atom in its chemical structure.

5. The process according to claim 4, wherein the polyimide B does not contain a fluorine atom in its chemical structure.

6. The process according to claim 1, wherein the polyimide B has a tensile elongation at break of 4% or more.

7. The process according to claim 1, wherein the polyimide A contains a silicon atom in its chemical structure.

8. The process according to claim 7, wherein the polyimide B does not contain a silicon atom in its chemical structure.

9. A process of producing a polyimide film of a multicomponent polyimide comprising the steps of:
   (1) mixing a polyimide component A and a polyimide component B to prepare a multicomponent polyimide blend solution,
   the polyimide component A being raw materials of a polyimide A and/or a polyimidation product of the raw materials, and the polyimide component B being raw materials of a polyimide B and/or a polyimidation product of the raw materials,
   the polyimide components A and B being combined to satisfy the relation: $2.35 \times N_A^{-2.09} < N_B < 450 \times N_A^{-1.12}$, wherein,
   the absolute difference between solubility parameter $SP_A$ of the polyimide A and solubility parameter $SP_B$ of the polyimide B, $|SP_B - SP_A|$, is 0.5 MPa$^{1/2}$ or greater, $N_A$ is the number average polymerization degree of the polyimide component A and $N_B$ is the number average polymerization degree of the polyimide component B, provided that the degree of polymerization of each of unreacted polyimide raw materials, a tetracarboxylic acid component and a diamine component, is taken as 0.5, the ratio of elastic modulus $E_B$ of a film of the polyimide B to elastic modulus $E_A$ of a film of the polyimide A, $E_B/E_A$, is 1.05 or higher, glass transition temperature $Tg_A$ of the polyimide A is lower than glass transition temperature $Tg_B$ of the polyimide B by 20° C. or more, and the polyimide A contains at least one of a fluorine atom and a silicon atom in its chemical structure;

(2) subjecting the multicomponent polyimide blend solution to further polyimidation reaction; and (3) removing a solvent from a film of the multicomponent polyimide obtained in step (2).

* * * * *